(12) United States Patent
Sunaga

(10) Patent No.: US 6,409,352 B1
(45) Date of Patent: Jun. 25, 2002

(54) OPTICAL SYSTEM, OPTICAL ELEMENT, AND OPTICAL DEVICE HAVING THE SAME

(75) Inventor: Toshihiro Sunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/648,738

(22) Filed: Aug. 28, 2000

(30) Foreign Application Priority Data

Aug. 30, 1999 (JP) .......................................... 11-243168

(51) Int. Cl.$^7$ ................................................. G02B 5/10
(52) U.S. Cl. ........................ 359/859; 359/366; 359/729
(58) Field of Search .............................. 359/364, 365, 359/366, 726, 729, 731, 857, 858, 859

(56) References Cited

U.S. PATENT DOCUMENTS

| | | | |
|---|---|---|---|
| 5,825,560 A | 10/1998 | Ogura et al. | 359/822 |
| 5,955,287 A | 9/1999 | Fernandez-Pol | 435/7.1 |
| 5,973,858 A | 10/1999 | Sekita | 359/729 |
| 5,999,311 A | 12/1999 | Nanba et al. | 359/365 |
| 6,021,004 A | 2/2000 | Sekita et al. | 359/676 |
| 6,097,550 A | 8/2000 | Kimura | 359/729 |
| 6,124,986 A | 9/2000 | Sekita et al. | 359/691 |
| 6,163,400 A * | 12/2000 | Nanba | 359/365 |
| 6,166,866 A | 12/2000 | Kimura et al. | 359/729 |
| 6,181,470 B1 | 1/2001 | Sekita | 359/364 |
| 6,215,596 B1 | 4/2001 | Araki et al. | 359/631 |
| 6,268,963 B1 | 7/2001 | Akiyama | 359/631 |
| 6,270,224 B1 | 8/2001 | Sunaga et al. | 359/857 |
| 6,278,553 B1 | 8/2001 | Akiyama | 359/627 |
| 6,292,309 B1 | 9/2001 | Sekita et al. | 359/729 |

FOREIGN PATENT DOCUMENTS

| | | |
|---|---|---|
| EP | 0 730 180 | 9/1996 |
| EP | 0 790 513 | 8/1997 |
| JP | 8-292371 | 11/1996 |
| JP | 8-292372 | 11/1996 |
| JP | 9-5650 | 1/1997 |
| JP | 9-222561 | 8/1997 |
| JP | 9-258105 | 10/1997 |

* cited by examiner

*Primary Examiner*—Mark A. Robinson
(74) *Attorney, Agent, or Firm*—Fitzpatrick, Cella, Harper & Scinto

(57) ABSTRACT

An optical system has an aperture stop, and an optical unit placed on the image side of the aperture stop. The optical unit consists of the following components in the order named from the object side: a first optical component with a reflective curved surface, for forming an intermediate image of an object, a second optical component with a reflective curved surface, for forming an image of the aperture stop with light from the intermediate image of the object, and a third optical component with a reflective curved surface, for forming a secondary image of the object with light from the image of the aperture stop. When $fB1(\theta)$, $fB2(\theta)$, and $fB3(\theta)$ are focal lengths of the first optical component, the second optical component, and the third optical component, respectively, at an azimuth $\theta$, the focal lengths satisfy the following conditions in the azimuth range of $0<\theta<2\pi$:

$fB1(\theta)>0$,
$fB2(\theta)<0$,
$fB3(\theta)>0$.

5 Claims, 13 Drawing Sheets

OPTICAL SYSTEM, OPTICAL ELEMENT, AND OPTICAL DEVICE HAVING THE SAME

BACKGROUND OF THE INVENTION

1. Field of the Invention

The present invention relates to an optical element used in optical devices such as video cameras, digital cameras, still video cameras, copiers, and so on and, more particularly, to an optical element with an imaging action having a structure of a plurality of curved, reflecting surfaces.

2. Related Background Art

Various proposals have been made heretofore about mirror optical systems making use of reflecting surfaces such as concave mirrors, convex mirrors, and so on. As an example of mirror optical systems, there is the so-called Cassegrain reflector telescope constructed for the purpose of decreasing the entire length of the optical system by folding the optical paths of the telephotographic lens system of the long entire lens length consisting of refracting lenses, by use of two opposed, reflecting mirrors.

For the objective system of telescopes, there are a number of known types to decrease the entire length of the optical system by use of a plurality of reflecting mirrors, in addition to the Cassegrain type, for the same reason.

In this way the compact mirror optical systems have been constructed heretofore by efficiently folding the optical paths, using the reflecting mirrors in place of lenses in the taking lens unit of the long entire lens length.

In these reflection type photographing optical systems, optical components need to be assembled with accuracy in order to achieve desired optical performance. Particularly, since errors in relative position accuracy of the reflecting mirrors strongly affect the optical performance, it is important to accurately adjust the position and angle of each reflecting mirror.

A method proposed as a solution to this problem is a method of constructing a mirror system with a plurality of reflectors from one block, thereby avoiding the assembly errors of the optical components during assembly.

For example, as to non-coaxial optical systems, it is known that the optical systems with well-corrected aberration can be constructed by introducing the conception of a reference axis and forming the constituent surfaces of asymmetric, aspherical surfaces; Japanese Patent Application Laid-Open No. 9-5650 describes the designing method thereof, and Japanese Patent Applications Laid-Open No. 8-292371, No. 8-292372, No. 9-222561, and No. 9-258105 describe the design examples thereof.

Such non-coaxial optical systems are called off-axial optical systems (which are optical systems defined as optical systems including a curved surface (off-axial curved surface) a normal to which at an intersection between the reference axis and the constituent surface is not present on the reference axis, the reference axis being an axis along a ray passing the center of the image (or the center of the object) and the center of the pupil, wherein the reference axis is bent).

In these off-axial optical systems, each constituent surface is generally non-coaxial and no eclipse will occur even if it is a reflecting surface; therefore, it is easy to construct the optical system with reflecting surfaces. They also have such features that routing of optical paths is relatively free and that it is easy to make an integral optical system by an integral molding technique of constituent surfaces.

FIG. 15 is a schematic diagram to show an embodiment of the reflecting optical system disclosed in Japanese Patent Application Laid-Open No. 8-292371.

In FIG. 15, numeral 21 designates an optical element having a plurality of curved, reflecting surfaces, which is made of a transparent body of glass or the like.

In the same drawing, light from an object OB passes a stop 1 and enters the reflection type optical element 21. In the optical element 21 the light is refracted at a first surface R1, is reflected at a second surface R2, a third surface R3, a fourth surface R4, a fifth surface R5, and a sixth surface R6, is refracted at a seventh surface R7, and then emerges from the optical element 21. At this time, the light forms a primary image on an intermediate image plane near the second surface R2 and forms a pupil near the fifth surface R5. Then the light emerging from the optical element 21 finally forms an image on an image pickup surface (an image pickup surface of an image pickup medium such as CCD or the like) 4.

In the prior art example of FIG. 15, the mirror optical system is constructed using the optical element 21 in which the reflecting surfaces consisting of a plurality of curved surfaces and/or planes are integrally formed, whereby the optical system can be constructed in a compact overall structure and with relaxed arrangement accuracy (assembly accuracy) of the reflecting mirrors, which is otherwise often high in the mirror optical system.

Further, the stop 1 is placed on the object side of the optical element 21 and the object image is formed at least once in the optical element, whereby the effective diameter of the optical element is reduced in spite of the construction of the reflection type optical element with a wide angle of view. In addition, a proper optical power is given to the plurality of reflecting surfaces forming the optical element and each reflecting surface of the optical element 21 is decentered, whereby the optical path in the optical element is bent in the desired shape, so as to decrease the entire length in a predetermined direction of the optical element.

The role of each surface will be described with reference to FIG. 16 for the reflective optical element with five off-axial reflecting surfaces as illustrated in FIG. 15. Let us define the entrance refracting surface as R1, the off-axial reflecting surfaces as R2 to R6, and the exit refracting surface as R7 in the order of passage of the light incident to the reflective optical element 21. Then a first component B1 is defined from the entrance refracting surface R1 to the off-axial reflecting surface R2, a second component B2 is defined from the off-axial reflecting surface R3 to the off-axial reflecting surface R5, and a third component B3 is defined from the off-axial reflecting surface R6 to the exit refracting surface. This means that the reflective optical element 21 consisting of the five off-axial reflecting surfaces is replaced by the three optical components. The first component B1 plays the role of intermediately imaging the incident light from the object, the second component B2 plays the role of focusing the light from the intermediate image plane at the pupil, and the third component B3 plays the role of secondarily focusing the light from the pupil image plane at the image pickup surface.

FIG. 17 shows the state of distortion and FIG. 18 the state of aberration on the image plane, of the reflective optical element illustrated in FIG. 15. As seen from FIG. 17 and FIG. 18, the distortion and aberration increases with distance from the center of the image plane.

When this embodiment is divided into three components of the first component B1 to the third component B3 of the reflective optical element as illustrated in FIG. 16, the first component B1 to the third component B3 all have their respective, positive focal lengths (positive optical powers).

In general, in the case of the optical element illustrated in FIG. 15, if the size of the intermediate image plane is large, i.e., if the focal length of the first component B1 is long in FIG. 16, effective diameters of the reflecting surfaces after the intermediate image plane will become large and it will result in making it difficult to decrease the size of the optical element. If the size of the intermediate image plane is too small, i.e., if the focal length of the first component B1 is too short, it will be difficult to correct the aberration by the optical surfaces after the intermediate image plane.

SUMMARY OF THE INVENTION

An object of the present invention is to provide a reflective optical element with a wide angle of view and with a reduced effective diameter, by properly arranging the power layout of surfaces so as to achieve excellent optical performance and by setting the focal length from the entrance surface to the intermediate image to an appropriate value, where the object image is formed on a predetermined plane by use of the optical element in which a plurality of reflecting surfaces consisting of curved surfaces and/or planes are formed on surfaces of a transparent body.

For accomplishing the above object, an optical system of the present invention is an optical system for forming an image of an object with light from the object, comprising:

an aperture stop; and an optical unit placed on the image side of the aperture stop, the optical unit comprising the following components in the order named from the object side:

a first optical component with a reflective curved surface, for forming an intermediate image of the object, a second optical component with a reflective curved surface, for forming an image of the aperture stop with light from the intermediate image of the object, and a third optical component with a reflective curved surface, for forming a secondary image of the object with light from the image of the aperture stop;

wherein, where $fB1(\theta)$, $fB2(\theta)$, and $fB3(\theta)$ are focal lengths of the first optical component, the second optical component, and the third optical component, respectively, and $f(\theta)$ is a total focal length of the optical unit, at an azimuth $\theta$, the focal lengths satisfy the following condition A or the following condition B in the azimuth range of $0<\theta<2\pi$:

Condition A:
 $fB1(\theta)>0$, $fB2(\theta)<0$ and $fB3(\theta)>0$

Condition B:
 $fB1(\theta)>0$, $fB2(\theta)>10|f(\theta)|$ and
 $fB3(\theta)>0$.

An optical element according to one aspect of the present invention is an optical element comprising:

a plurality of reflective curved surfaces for successively reflecting light incident on the optical element, the plurality of reflective curved surfaces comprising a reflective curved surface for first reflecting the light incident on the optical element, as a surface A, a reflective curved surface for next reflecting the light reflected by the surface A, as a surface B, a reflective curved surface for finally reflecting the light incident on the optical element, as a surface D, and a reflective curved surface immediately before the surface D, as a surface C, wherein, in an order of path of the light incident to the optical element, a first optical component is defined before the surface A, a second optical component is defined from the surface B to the surface C, and a third optical component is defined after the surface D and wherein, where $fB1(\theta)$, $fB2(\theta)$, and $fB3(\theta)$ are focal lengths of the first optical component, the second optical component, and the third optical component, respectively, and $f(\theta)$ is a total focal length of the optical element, at an azimuth $\theta$, and the focal lengths satisfy the following condition A or the following condition B in the azimuth range of $0<\theta<2\pi$:

Condition A:
 $fB1(\theta)>0$, $fB2(\theta)<0$ and $fB3(\theta)>0$

Condition B:
 $fB1(\theta)>0$, $fB2(\theta)>10|f(\theta)|$ and
 $fB3(\theta)>0$.

Each of optical devices according to the present invention comprises the optical system or either of the optical elements of the present invention as described above.

DETAILED DESCRIPTION OF THE PREFERRED EMBODIMENTS

Figure 14:
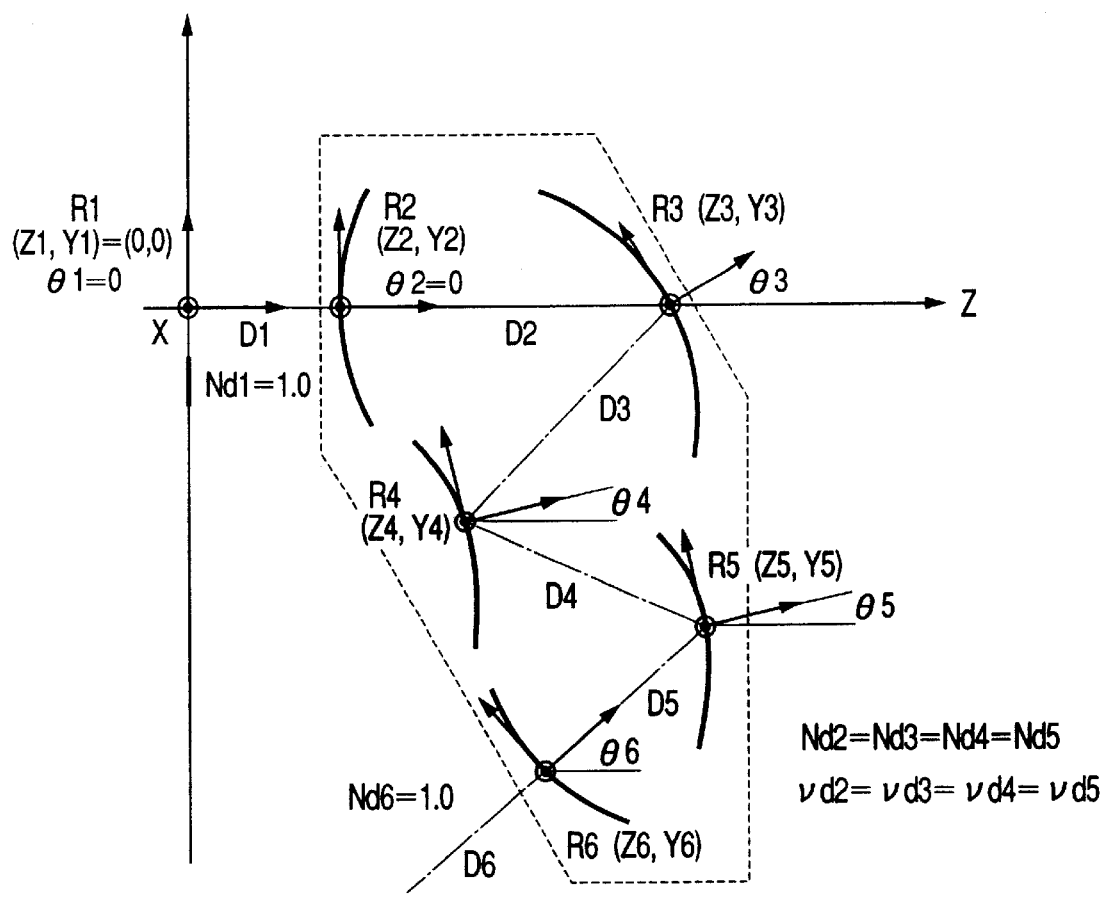
FIG. 14 is an explanatory diagram to illustrate the coordinate systems in the embodiments.
Figure 15:
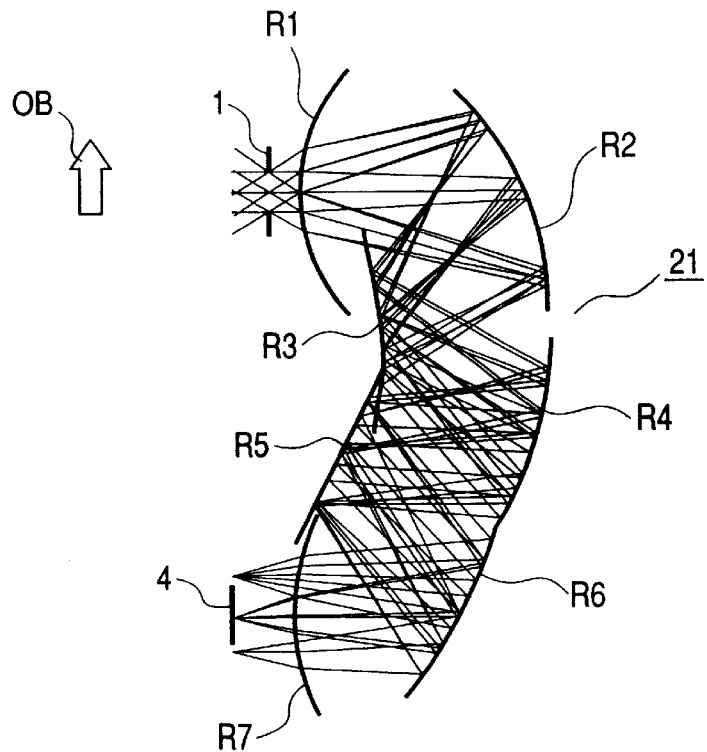
FIG. 15 is an optical cross-sectional view in the YZ plane of the conventional, reflective, optical element.
Figure 16:
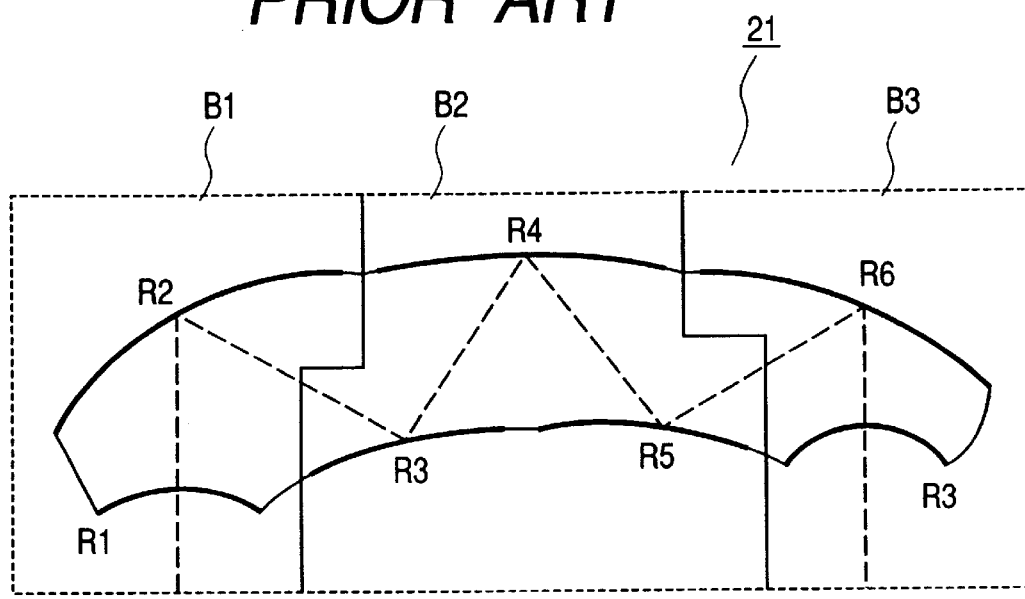
FIG. 16 is an explanatory diagram to illustrate partial systems of the conventional, reflective, optical element.
Figure 17:
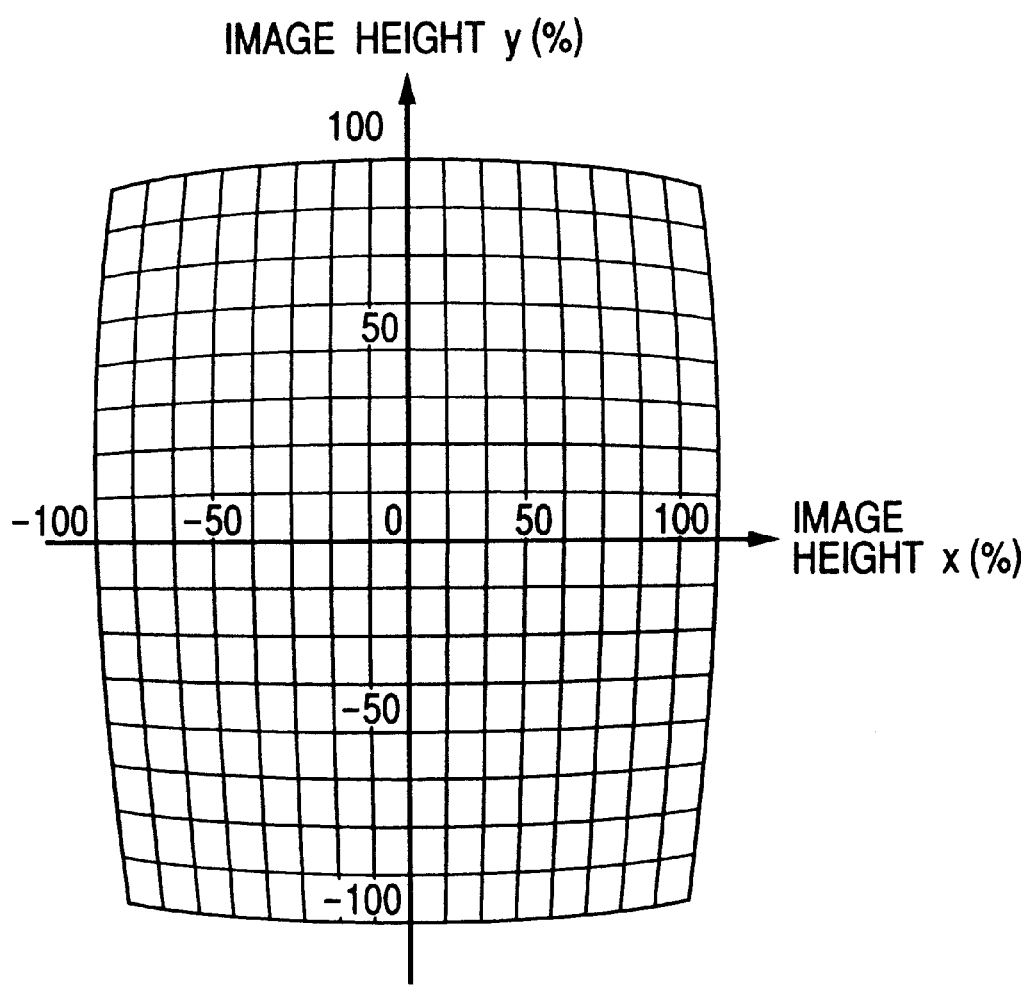
FIG. 17 is a distortion chart of the conventional, reflective, optical element.
Figure 18:
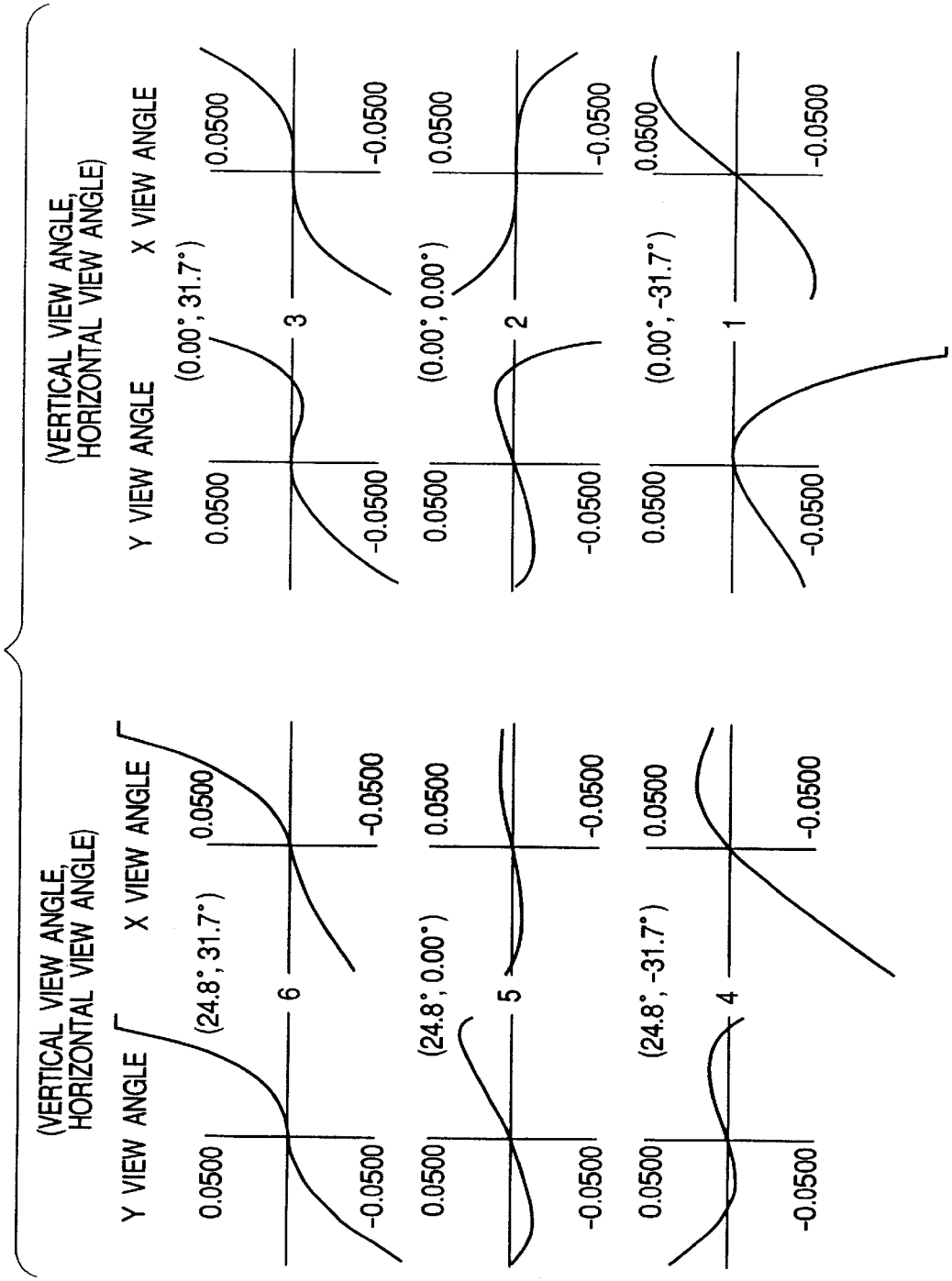
FIG. 18 is a transverse aberration chart to show the transverse aberration of the conventional, reflective, optical element.

How to represent the construction specifications of the embodiments and common matters to all the embodiments will be described prior to the description of the embodiments of the present invention. FIG. 14 is an explanatory diagram to illustrate the coordinate systems to define structural data of the optical systems of the present invention. In the embodiments of the present invention the ith surface is a surface located at the ith position along a ray traveling from the object side to the image plane (which is a ray indicated by a chain line in FIG. 14 and which will be called a reference-axis ray). In FIG. 14 the first surface R1 is a stop, the second surface R2 is a refracting surface coaxial with the first surface, the third surface R3 is a reflecting surface tilted relative to the second surface R2, the fourth surface R4 and the fifth surface R5 are reflecting surfaces shifted and tilted relative to their preceding surface, and the sixth surface R6 is a refracting surface shifted and tilted relative to the fifth surface R5. The surfaces of the second surface R2 to the sixth surface R6 are formed on one optical element made of a medium of glass, a plastic material, or the like.

Consequently, in the structure of FIG. 14, the medium between the unrepresented object surface and the second surface R2 is the air, the medium between the second surface R2 and the sixth surface R6 is a certain, common medium, and the medium between the sixth surface R6 and an unrepresented seventh surface R7 is the air.

Since the optical systems of the present invention are off-axial optical systems, the surfaces forming each optical system have no common optical axis. Then, an absolute coordinate system is first set with the origin at the center of the ray effective diameter of the first surface in the embodiments of the present invention.

In the embodiments of the present invention, the origin is at the center point of the ray effective diameter of the first surface and the reference axis of the optical system is defined as a path of the ray (reference-axis ray) passing the origin and the center of the final image plane. Further, the reference axis in the embodiments has its direction (orientation). The direction is defined along a traveling direction of the reference-axis ray toward the image plane.

In the embodiments of the present invention, the reference axis as a reference of the optical system was set as described above, but the axis as a reference of the optical system can be determined by employing any convenient axis in terms of optical designing, handling of aberration, or expression of the shape of each surface forming the optical system. However, it is common practice to set the reference axis as a reference of the optical system along a path of a ray passing the center of the image plane, and either the center of the stop or the entrance pupil or the exit pupil or the first surface of the optical system, or the center of the final surface.

In the embodiments of the present invention, the reference axis is set along the path in which the ray (reference-axis ray) passing the center point of the ray effective diameter of the first surface, i.e., the stop surface (the center of the pupil) and entering the center of the final image plane is refracted and reflected by the refracting surfaces and the reflecting surfaces. The number of each surface is determined according to the order of refraction and reflection of the reference-axis ray.

Therefore, the reference axis runs along the sequence of the surfaces thus set according to the law of refraction or reflection with changing its direction, and then finally reaches the center of the image plane.

In each of the embodiments of the present invention the tilt surfaces of the optical system all are basically tilted in a common plane. Thus the axes of the absolute coordinate system are defined as follows.

Z-axis: reference axis running through the origin and toward the second surface R2 Y-axis: straight line passing the origin and making the angle of 90° counterclockwise relative to the Z-axis in the tilt plane (i.e., in the plane of FIG. 14)

X-axis: straight line normal to each of the Z- and Y-axes through the origin (straight line normal to the plane of FIG. 14)

For expressing the surface shape of the ith surface forming the optical system, the way of setting a local coordinate system with the origin at an intersecting point between the reference axis and the ith surface and expressing the surface shape of the surface by the local coordinate system is better to understand in recognition of the shape than the representation of the shape of the surface by the absolute coordinate system, and, therefore, the surface shape of the ith surface will be expressed by the local coordinate system in the embodiments provided with presentation of structural data of the present invention.

A tilt angle in the YZ plane of the ith surface is expressed by an angle $\theta i$ (in units of °) the positive direction of which is the counterclockwise direction relative to the Z-axis of the absolute coordinate system on the plane of the drawing. Therefore, the origin of the local coordinate system of each surface is on the YZ plane in FIG. 14 in the embodiments of the present invention. There is no eccentricity of the surface in the XZ and XY planes. Further, the y- and z-axes of local coordinates (x, y, z) of the ith surface are inclined at the angle $\theta i$ in the YZ plane relative to the absolute coordinate system (X, Y, Z), and the axes are set specifically as follows.

z-axis: straight line passing the origin of the local coordinate system and making the angle $\theta i$ in the counterclockwise direction relative to the Z-direction of the absolute coordinate system in the YZ plane on the plane of the drawing y-axis: straight line passing the origin of the local coordinate system and making the angle of 90° in the counterclockwise direction relative to the z-direction in the YZ plane on the plane of the drawing x-axis: straight line passing the origin of the local coordinate system and being normal to the YZ plane Di indicates a scalar quantity to represent a spacing between origins of the local coordinate systems of the ith surface and the (i+1)th surface, and Ndi and vdi the refractive index and Abbe's number of the medium between the ith surface and the (i+1)th surface.

The cross-sectional view and numerical data of the optical system will be presented in the embodiments of the present invention.

The spherical surfaces are of the shape represented by the following equation:

$$z = [(x^2+y^2)/Ri]/[1+\{1-(x^2+y^2)/Ri^2\}^{1/2}].$$

The optical system of the present invention has at least one or more rotationally asymmetric, aspherical surfaces, and the shape thereof is represented by the following equation:

$$z = C02y^2+C20x^2+C03y^3+C21x^2y+C04y^4+C22x^2y^2+C40x^4+C05y^5+C23x^2y^3+C41x^4y+C06y^6+C24x^2y^4+C42x^4y^2+C60x^6.$$

Since the above curved surface equation involves only the even-degree terms with respect to x, curved surfaces defined by the above curved surface equation are of plane-symmetric shape with respect to only the symmetry plane of the yz plane. If a surface further satisfies the following condition, the shape thereof will be also symmetric with respect to the xz plane.

C03=C21=C05=C23=C41=0

If a surface further satisfies the following conditions, the shape thereof will be rotationally symmetric.

C02=C20, C04=C40=C22/2, and C06=C60=C24/3=C42/3

If either of these conditions is not met, the shape will be rotationally asymmetric.

In each of the embodiments of the present invention the horizontal half angle of view uY is an angle equal to half of a maximum view angle of the light incident to the first surface R1 in the YZ plane of FIG. 14, and the vertical half angle of view uX an angle equal to half of a maximum view angle of the light incident to the first surface R1 in the XZ plane. The diameter of the stop is presented as a stop diameter. This is related to brightness of the optical system.

In the transverse aberration charts of the embodiments, the transverse aberration is presented for beams with angles of incidence to the first surface R1 being the vertical and horizontal incident angles of (0, uY), (0, 0), (0, -uY), (uX, uY), (uX, 0), and (uX, -uY), respectively. In the transverse aberration charts, the abscissa axis represents the heights of the incident ray and the ordinate axis represents the aberration amounts. Since in each embodiment each surface is basically of the plane-symmetric shape with respect to the symmetry plane of the yz plane, the transverse aberration in the minus direction of the vertical view angle is the same as that in the plus direction in the transverse aberration charts and thus, for simplicity of the charts, the transverse aberration in the minus direction is omitted from the transverse aberration charts.

The specific embodiments of the optical element of the present invention will be described below with reference to the drawings.

Figure 1:
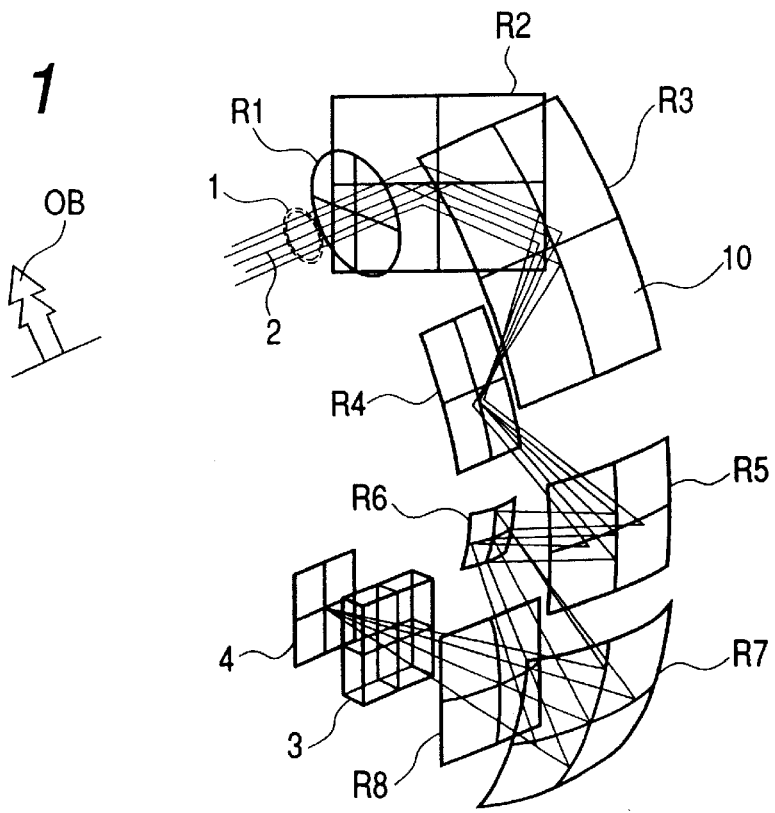
FIG. 1 is a perspective view to show the main part of an imaging apparatus in Embodiment 1.
Figure 2:
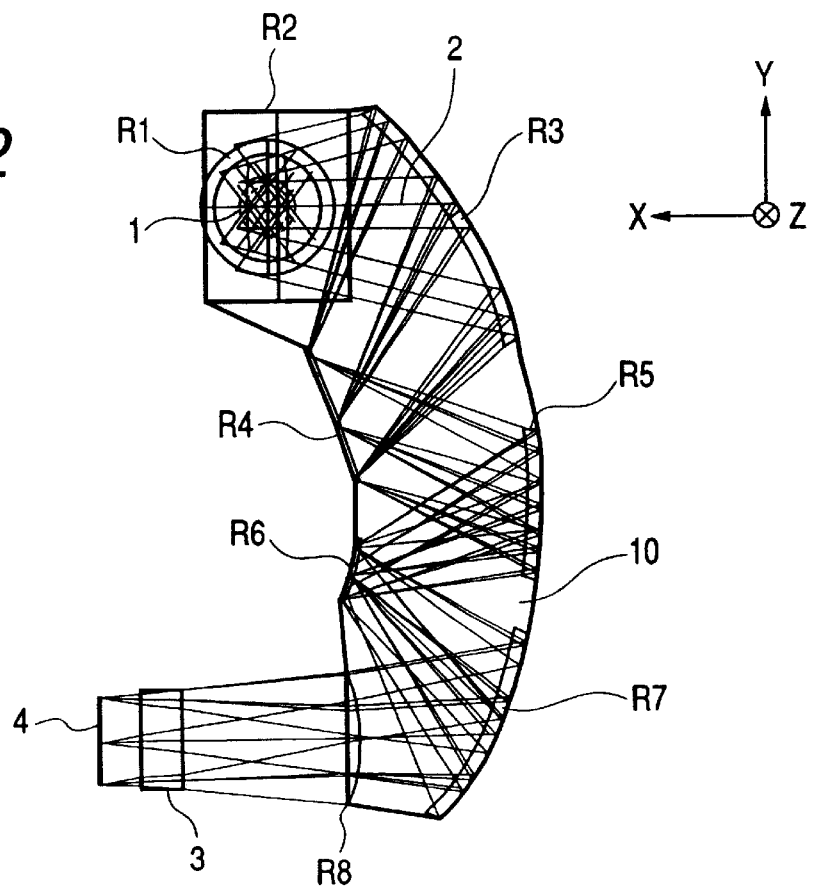
FIG. 2 is a cross-sectional view to show the main part of the imaging apparatus in Embodiment 1.

FIG. 1 is a perspective view to show the main part of Embodiment 1 of the imaging apparatus using the reflective optical element of the present invention and FIG. 2 a cross-sectional view of the main part in the YZ plane of FIG. 1. The present embodiment shows the reflective optical element with the horizontal view angle of 43.8° and the vertical view angle of 33.55°, and FIG. 2 also includes an illustration of optical paths.

In the figures, numeral 10 denotes the optical element, 1 denotes the stop, 2 denotes the reference axis, 3 denotes an optical filter, and 4 denotes the image pickup surface, on which a photoelectric conversion element, for example, such as CCD or the like, is placed. (It is noted that the stop 1 may also be handled as an element of the optical element 10.) In the optical element 10 the surfaces R1 to R3 compose the first component B1 for intermediately forming the image of the object OB, the surfaces R4 to R6 comprise the second component B2 for forming the image of the stop 1 with light from the intermediate image (to from the pupil image), and the surfaces R7 and R8 comprise the third component B3 for refocusing the light from the pupil to form the image of the object OB on the image pickup surface 4.

In the present embodiment, there are the first off-axial reflecting surface R3, the second off-axial reflecting surface R4, the last off-axial reflecting surface R7 in the optical element 10, and the off-axial reflecting surface R6 one before the surface R7 on the light incidence side arranged in the order of passage after incidence of the light to the optical element, the first component B1 is defined from the entrance surface through which the light is incident to the optical element 10, to the off-axial reflecting surface R3, the second component B2 is defined from the off-axial reflecting surface R4 to the off-axial reflecting surface R6, the third component B3 is defined from the off-axial-reflecting surface R7 to the exit surface through which the light emerges from the optical element, and the focal lengths $fB1(\theta)$, $fB2(\theta)$, $fB3(\theta)$ of the respective first component B1, second component B2, and third component B3 at the azimuth $\theta$ satisfy the following conditions.

$$fB1(\theta)>0, fB2(\theta)<0, fB3(\theta)>0 (0<\theta<2\pi) \quad (1)$$

Further, the focal length $fB1(\theta)$ of the first component B1 and the total focal length $f(\theta)$ of the reflective optical element 10 at the azimuth $\theta$ satisfy the following condition.

$$|f(\theta)|/2<fB1(\theta)<2|f(\theta)| \quad (2)$$

Only in the case of the present embodiment, there are two tilt types of the surfaces, i.e., a tilt in the XZ plane and a tilt in the XY plane, and thus the definition of the local coordinate systems is different. First, a tilt angle in the XZ plane, of the ith surface is indicated by an angle $\phi i$ (in units of degrees) the positive direction of which is the clockwise direction relative to the positive direction of the Y-axis, and a tilt angle in the XY plane is indicated by an angle $\theta i$ (in units of degrees) the positive direction of which is the counterclockwise direction relative to the positive direction of the Z-axis. Further, the axes of the local coordinates (x, y, z) of the ith surface are those obtained by first moving the origin to (Xi, Yi, Zi) on the absolute coordinate system (X, Y, Z), inclining the axes by the angle $\phi i$ in the XZ plane, and finally inclining the axes by the angle $\theta i$ in the XY plane, and the axes are specifically set as follows.

With the origin (Xi, Yi, Zi), z: direction inclined at the angle $\phi i$ in the XZ plane relative to the Z-direction being the direction of the optical axis of the first surface and inclined at the angle $\theta i$ in the XY plane y: direction making the angle of 90° counterclockwise relative to the z-direction in the YZ plane x: direction normal to the YZ plane with the origin at the position of the vertex of the reflecting surface The structural data of the present embodiment is as follows.

TABLE 1

| | | | | Horizontal half angle of view | | 21.9 | | | | |
| | | | | Vertical half angle of view | | 16.8 | | | | |
| | | | | Stop diameter | | 1.60 | | | | |
| i | Xi | Yi | Zi | θi | φi | ωi | Di | Ndi | νdi | |
|---|---|---|---|---|---|---|---|---|---|---|
| | 0.000 | 0.000 | 0.000 | 0.000 | 0.000 | 0.000 | 2.500 | 1.000 | | Stop |
| 1 | 0.000 | 0.000 | 2.500 | 0.000 | 0.000 | 0.000 | 3.700 | 1.530 | 55.8 | Refractive surface |
| 2 | 0.000 | 0.000 | 6.200 | 0.000 | -45.000 | 0.000 | 7.397 | 1.530 | 55.8 | Reflective surface |
| 3 | -7.397 | 0.000 | 6.200 | -90.000 | -59.242 | -90.000 | 9.995 | 1.530 | 55.8 | Reflective surface |

TABLE 1-continued

| | | | | | | | | | | |
|---|---|---|---|---|---|---|---|---|---|---|
| 4 | −2.631 | −8.785 | 6.200 | −90.000 | −71.044 | −90.000 | 8.500 | 1.530 | 55.8 | Reflective surface |
| 5 | −10.419 | −12.189 | 6.200 | 90.000 | −87.280 | 90.000 | 7.700 | 1.530 | 55.8 | Reflective surface |
| 6 | −3.103 | −14.590 | 6.200 | 90.000 | −74.030 | 90.000 | 8.500 | 1.530 | 55.8 | Reflective surface |
| 7 | −8.555 | −21.111 | 6.200 | 90.000 | −64.947 | 90.000 | 5.300 | 1.530 | 55.8 | Reflective surface |
| 8 | −3.255 | −21.111 | 6.200 | 0.000 | −90.000 | 0.000 | 5.917 | 1.000 | | Refractive surface |
| Filter | 2.663 | −21.111 | 6.200 | 0.000 | −90.000 | 0.000 | 1.060 | 1.544 | 70.6 | Refractive surface |
| Filter | 3.723 | −21.111 | 6.200 | 0.000 | −90.000 | 0.000 | 1.600 | 1.514 | 75 | Refractive surface |
| Filter | 5.323 | −21.111 | 6.200 | 0.000 | −90.000 | 0.000 | 0.800 | 1.516 | | Refractive surface |
| Filter | 6.123 | −21.111 | 6.200 | 0.000 | −90.000 | 0.000 | 0.416 | 1.000 | | Refractive surface |
| Image plane | 6.939 | −21.111 | 6.2 | 0 | 90 | 0 | 1 | | | |

Aspherical surface shape

R2 surface

C02 = −3.87385e−02  C20 = 4.08337e−02
C04 = 7.49722e−03   C22 = −2.54957e−03
C06 = −4.97281e−04  C24 = −4.50122e−04   C40 = −5.35064e−03
                                         C42 = 7.58477e−04     c60 = 4.23326e−04

R3 surface

C02 = 2.55492e−02   C20 = 3.37945e−02
C03 = −1.14854e−04  C21 = −4.08791e−04
C04 = 7.73154e−06   C22 = 3.48184e−05    C40 = 1.01388e−05

R4 surface

C02 = 1.61293e−02   C20 = 4.12933e−02
C03 = −1.38841e−03  C21 = −3.47993e−03
C04 = 4.42324e−05   C22 = 4.83511e−04    C40 = −6.31515e−04

R5 surface

C02 = 2.31849e−02   C20 = 3.52955e−02
C03 = −5.28689e−05  C21 = −4.51412e−04
C04 = 1.02369e−04   C22 = 2.14352e−04    C40 = 6.38284e−05

R6 surface

C02 = 3.45979e−02   C20 = 8.08696e−02
C03 = 3.33596e−03   C21 = 3.14123e−03
C04 = 5.23405e−04   C22 = 2.82194e−03    C40 = 1.94772e−03

R7 surface

C02 = 3.17142e−02   C20 = 4.06422e−02
C03 = 1.74096e−04   C21 = 1.22917e−04
C04 = 5.65180e−05   C22 = 1.87502e−04    C40 = 1.10281e−04

R8 surface

C02 = 4.85470e−02   C20 = 6.40000e−02
C04 = 1.16007e−03   C22 = 1.84312e−03    C40 = 5.25575e−04
C06 = −4.76425e−06  C24 = −1.09562e−05   C42 = 5.60718e−06    c60 = 6.86201e−07

The focal lengths fB1, fB2, and fB3 of the respective first component B1 (surfaces R1 to R3), second component B2 (surfaces R4 to R6), and third component B3 (surfaces R7 to R8) and the total focal length f of the reflective optical element 10 are calculated at the azimuths of 0°, 45°, and 90°, and the results thereof are as follows.

TABLE 2

| focal length\azimuth | 0° | 45° | 90° |
|---|---|---|---|
| fB1 | 5.13 | 5.57 | 6.05 |
| fB2 | −6.81 | −6.12 | −6.83 |
| fB3 | 4.98 | 4.86 | 4.75 |
| f | −4.5 | −4.5 | −4.5 |

In the optical element 10 of the present embodiment the focal lengths fB1, fB2, fB3 of the respective first component B1, second component B2, and third component B3 are arranged in the order of positive, negative, and positive so as to satisfy Eq. (1). The magnitude of the focal length fB1 of the first component B1 is in the relation of not less than half and not more than double of the magnitude of the total focal length f of the optical element 10 so as to satisfy Eq. (2). If the magnitude of the focal length fB1 of the first component B1 is not more than half of the magnitude of the focal length f of the optical element 10, it will be very difficult to effect correction for aberration. If it is not less than double the magnitude of the focal length f of the optical element 10 on the other hand, the intermediate image plane will become large and this will increase the effective diameters of the reflecting surfaces after the intermediate image plane, thus making reduction in the size of the element difficult.

The above table presented the list of the focal lengths at the azimuths of 0°, 45°, and 90°, but it is noted that this relation is maintained between the azimuths 0° and 2π.

In FIG. 1 and FIG. 2, the optical element 10 is made of the transparent body of glass or the like having the plurality of curved, reflecting surfaces. On the surfaces of the optical element 10 there are the refracting surface (entrance surface) R1 with a refractive power, the five reflecting surfaces of the plane mirror R2, the concave mirror R3, the convex mirror R4, the concave mirror R5, the convex reflecting surface R6, and the concave mirror R7, and the convex refracting surface (exit surface) R8 with a positive refractive power arranged in the order of passage of rays from the object OB. The two refracting surfaces R1, R8 are both of the rotationally asymmetric, aspherical shape, and all the reflecting surfaces are of the aspherical shape symmetric with respect to only the YZ plane. The filter 3 in the figures is constructed of an optical low-pass filter, an infrared cut filter, or the like.

The imaging action of the optical element 10 in the present embodiment will be described below. The light traveling in the Z(−) direction from the object OB is regulated in the quantity of incident light by the stop (entrance pupil) 1 and thereafter is incident to the entrance surface R1 of the optical element 10. Then the light is reflected by the reflecting plane R2 to be deflected into the X(−) direction. Then the light is reflected by the surface R3 to form an image once. Then the light is successively reflected by the surfaces R4, R5, R6, and R7 and thereafter emerges from the exit surface R8 in the X(+) direction. After that, the light travels through the filter 3 to be refocused on the image pickup surface 4.

The object rays form the intermediate image between the surface R3 and the surface R4 and the pupil rays the intermediate image between the surface R6 and the surface R7.

As described above, the optical element 10 functions in a manner similar to a lens unit of a positive optical power as a whole with desired optical performance through the optical powers of the entrance and exit surfaces and the optical powers of the curved reflectors therein.

Figure 3:
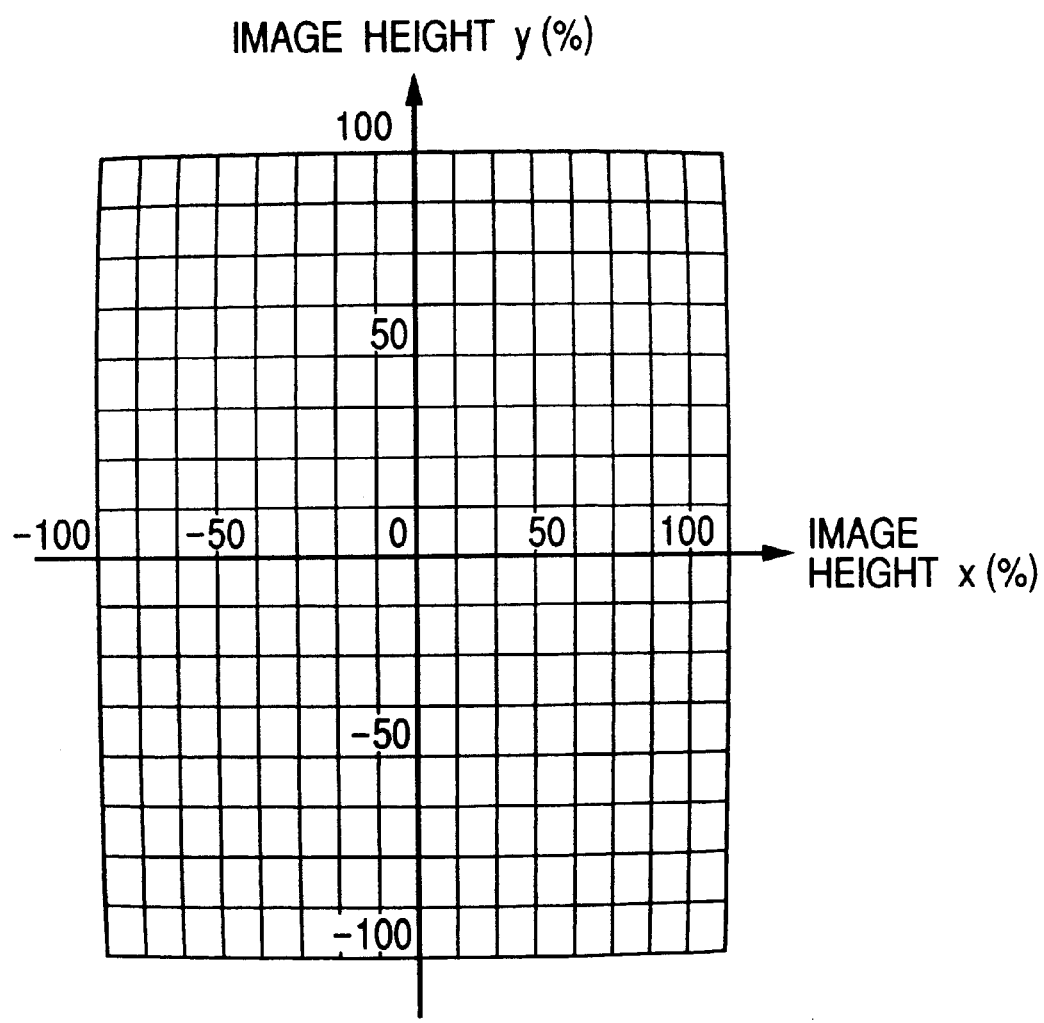
FIG. 3 is a distortion chart to show the distortion of the optical element in Embodiment 1.
Figure 4:
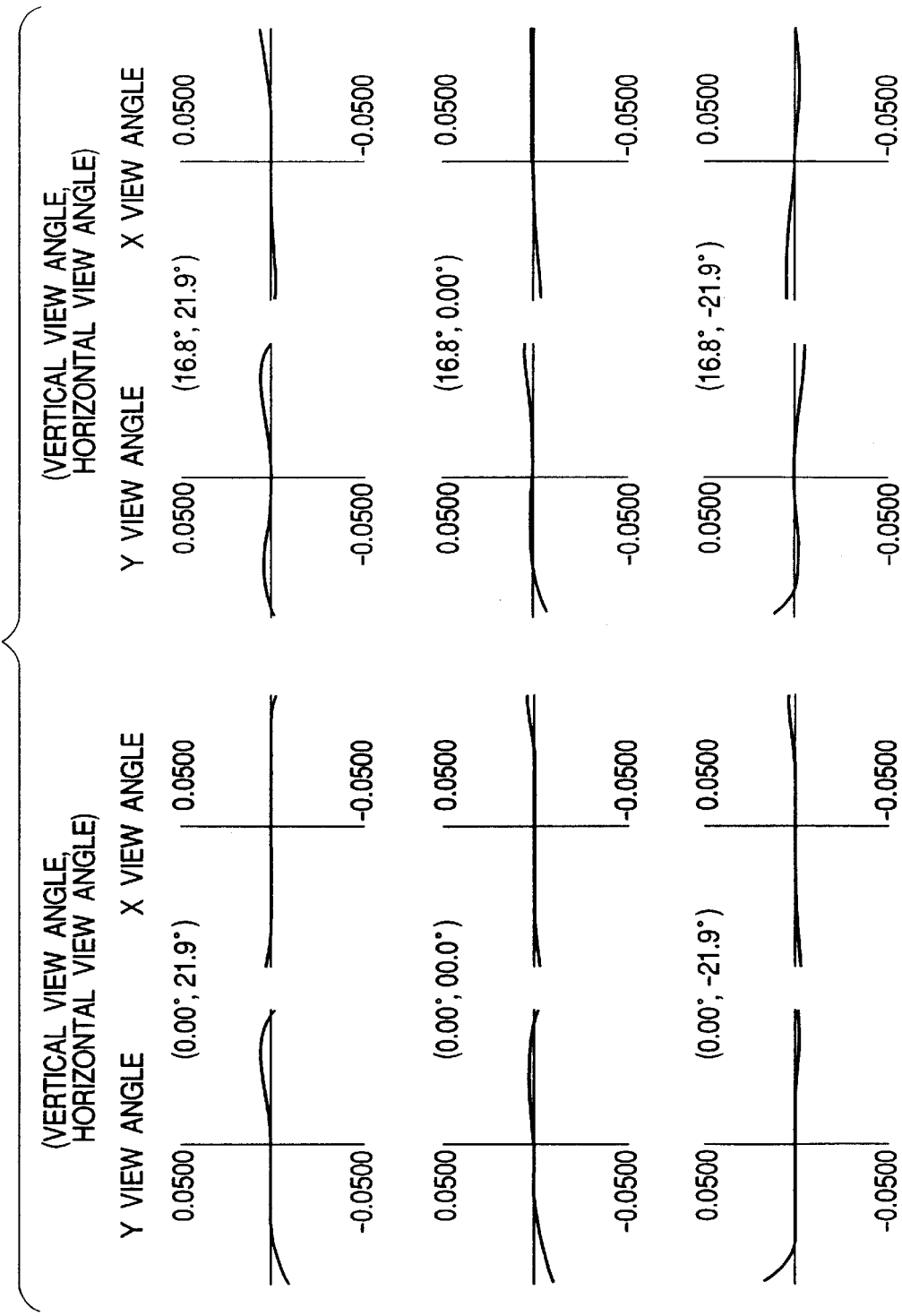
FIG. 4 is a transverse aberration chart to show the transverse aberration of the optical element in Embodiment 1.

FIG. 3 shows the state of distortion and FIG. 4 the transverse aberration chart of the reflective optical element of the present embodiment.

As apparent from the figure, there is no large distortion and little asymmetric distortion. The transverse aberration is also small and is also corrected well at the center and at the corners of the image plane.

This is because the focal lengths fB1, fB2, fB3 of the first component B1, the second component B2, and the third component B3 are arranged in the appropriate setting so as to satisfy Eq. (1) as described previously. If the focal lengths fB1, fB2, fB3 of the first component B1, the second component B2, and the third component B3 were set in the same sign and to values of magnitude close to each other, correction for aberration would be difficult in terms of the balance of the optical system.

Since the magnitude of the focal length fB1 of the first component B1 is set to the appropriate value so as to satisfy Eq. (2), the optical element 10 is constructed to have both the compact size and excellent optical performance.

In the present embodiment a rotationally asymmetric, aspherical shape is employed for the refracting surfaces, but the refracting surfaces may be of the rotationally symmetric shape, depending upon the design. The refracting surfaces are desirably covered by a reflection reducing coating.

The reflecting surfaces of the reflective optical element are formed by evaporation of metal or the like. In the case of evaporation, it is carried out according to a process of depositing a film on one of two reflector groups (R3, R5, R7 and R2, R4, R6) and then depositing a film on the rest reflector group. The deposition on the reflecting surfaces does not have to be limited to the evaporation, but may be carried out by wet methods, for example, plating or the like. In this case, deposition can be implemented simultaneously on the two opposed reflecting surfaces. After the deposition by plating or the like, a protective film with high transmittance characteristics may be deposited thereon.

In the present embodiment the off-axial reflecting surfaces are used in the form of the back reflecting surfaces in the optical element (internal reflecting surfaces inside the optical element), but they may also be used in the form of surface reflectors.

The present embodiment uses the five surfaces of the off-axial reflecting surfaces, but the reflecting surfaces do not have to be limited to five surfaces. It is, however, desirable to use at least five or more surfaces in view of the correction for aberration.

The off-axial reflecting surfaces are of a shape symmetric only with respect to a certain plane (XY plane), but they are not limited to this.

This reflective optical element singly functions as an image pickup element, but an image pickup optical system may also be constructed of a plurality of optical elements including at least one reflective optical element of this type. Further, a zooming optical system may also be constructed so as to change the relative positions of optical elements, as suggested in Japanese Patent Applications Laid-Open No. 8-292372, No. 9-222561, and No. 9-258105.

Figure 5:
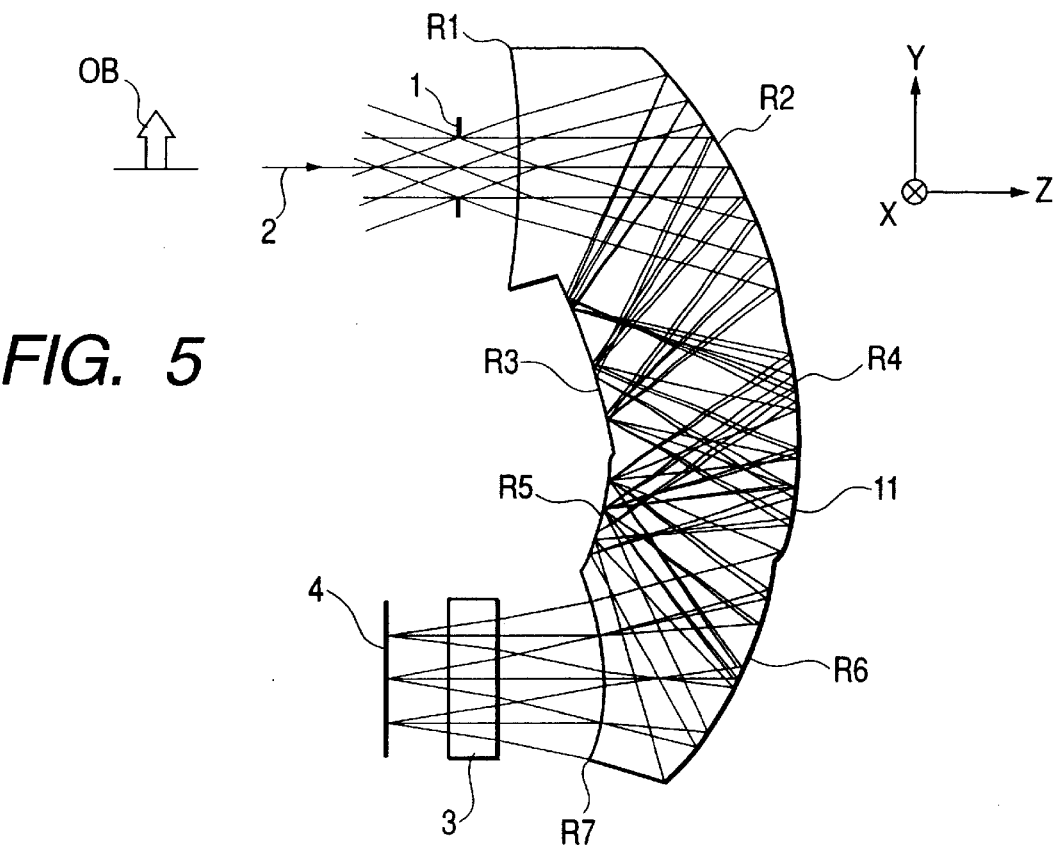
FIG. 5 is an optical cross-sectional view in the YZ plane of the imaging apparatus in Embodiment 2.

FIG. 5 is a cross-sectional view to show the main part of Embodiment 2 of the imaging apparatus using the reflective optical element of the present invention.

In the same figure the same elements as those illustrated in FIG. 1 are denoted by the same reference symbols. Numeral 11 designates the optical element.

In the present embodiment, there are the first off-axial reflecting surface R2, the second off-axial reflecting surface R3, the last off-axial reflecting surface R6 in the optical element 11, and the off-axial reflecting surface R5 one before the surface R6 on the light incidence side arranged in the order of passage after incidence of the light to the optical element 11, the first component B1 for intermediately forming the image of the object OB is defined from the entrance surface R1 through which the light is incident to the optical element 11, to the off-axial reflecting surface R2, the second component B2 for forming the image of the stop 1 with the light from the intermediate image of the object (to form the pupil image) is defined from the off-axial reflecting surface R2 to the off axial reflecting surface R5, the third component B3 for refocusing the light from the pupil to form the image of the object OB on the image pickup surface 4 is defined from the off-axial reflecting surface R6 to the exit surface R7 through which the light emerges from the optical element 11, and the focal lengths fB1(θ), fB2(θ), and fB3(θ) of the first component B1, the second component B2, and the third component B3 and the focal length f(θ) of the optical element 11 at the azimuth θ satisfy the following conditions.

$$fB1(\theta)>0,\ fB2(\theta)>10|f(\theta)|,\ fB3(\theta)>0 (0<\theta<2\pi) \quad (3)$$

FIG. 5 is the cross-sectional view in the YZ plane. The present embodiment shows the reflective optical element with the horizontal view angle of 43.8° and the vertical view angle of 33.55°. FIG. 5 also includes the illustration of optical paths.

The structural data of the present embodiment is as follows.

TABLE 3

| | | Horizontal half angle of view | | 21.9 | | |
| | | Vertical half angle of view | | 16.8 | | |
| | | Stop diameter | | 2.25 | | |
| i | Yi | Zi | θi | Di | Ndi | νdi | |
| | 0.00 | 0.00 | 0.00 | 2.50 | 1 | | Stop |
| 1 | 0.00 | 2.50 | 0.00 | 8.61 | 1.53041 | 55.50 | Refractive surface |

TABLE 3-continued

| | | | | | | | |
|---|---|---|---|---|---|---|---|
| 2 | 0.00 | 11.11 | 27.95 | 10.00 | 1.53041 | 55.50 | Reflective surface |
| 3 | −8.28 | 5.50 | 17.01 | 8.88 | 1.53041 | 55.50 | Reflective surface |
| 4 | −11.59 | 13.74 | −1.87 | 8.30 | 1.53041 | 55.50 | Reflective surface |
| 5 | −14.17 | 5.86 | −15.87 | 8.68 | 1.53041 | 55.50 | Reflective surface |
| 6 | −20.81 | 11.45 | −24.93 | 5.40 | 1.53041 | 55.50 | Reflective surface |
| 7 | −20.81 | 6.05 | 0.00 | 4.42 | 1 | | Refractive surface |
| Filter | −20.81 | 1.63 | 0.00 | 1.89 | 1.54427 | 70.60 | Refractive surface |
| Filter | −20.81 | −0.25 | 0.00 | 1.10 | 1.51400 | 75.00 | Refractive surface |
| Filter | −20.81 | −1.35 | 0.00 | 0.80 | 1.51633 | 0.00 | Refractive surface |
| Filter | −20.81 | −2.15 | 0.00 | 0.60 | 1 | | Refractive surface |
| Image plane | −20.81 | −2.75 | 0.00 | | 1 | | Image plane |

Spherical surface shape

R1 surface    r4 = −28.581
R7 surface    r10 = −8.244

Aspherical surface shape

R2 surface $C02 = -2.79654e-02$    $C20 = -3.52817e-02$
$C03 = 8.45358e-05$    $C21 = 1.62935e-05$
$C04 = 1.09163e-05$    $C22 = 2.29474e-05$    $C40 = -7.99153e-06$
$C05 = 3.28771e-06$    $C23 = 4.14164e-06$    $C41 = -2.81135e-07$
$C06 = 2.30226e-07$    $C24 = -2.89993e-08$    $C42 = -3.86130e-07$    $c60 = 4.26026e-08$ R3 surface $C02 = -1.52512e-02$    $C20 = -3.32837e-02$
$C03 = 1.17284e-03$    $C21 = 7.53355e-04$
$C04 = -1.74184e-04$    $C22 = 6.85821e-05$    $C40 = -1.07454e-04$
$C05 = -6.59147e-05$    $C23 = -2.53153e-04$    $C41 = -1.82673e-05$
$C06 = 2.29241e-05$    $C24 = 8.97809e-06$    $C42 = -1.49497e-04$    $c60 = 1.24757e-04$ R4 surface $C02 = -2.86447e-02$    $C20 = -3.69342e-02$
$C03 = 1.68338e-04$    $C21 = -6.56488e-05$
$C04 = -8.38998e-05$    $C22 = -1.64956e-04$    $C40 = -6.61334e-05$
$C05 = -4.12487e-06$    $C23 = -3.65721e-06$    $C41 = -9.86438e-07$
$C06 = 1.46460e-07$    $C24 = -2.92710e-07$    $C42 = -1.45737e-06$    $c60 = 2.62185e-08$ R5 surface $C02 = -4.01467e-02$    $C20 = -8.41944e-02$
$C03 = -1.52586e-03$    $C21 = -4.48355e-03$
$C04 = -7.68031e-04$    $C22 = -2.38226e-03$    $C40 = -1.49262e-03$
$C05 = -7.67143e-05$    $C23 = -3.07223e-04$    $C41 = -2.44715e-04$
$C06 = -2.25468e-05$    $C24 = -1.27369e-04$    $C42 = -1.54549e-04$    $c60 = -9.66124e-06$ R6 surface $C02 = -3.26890e-02$    $C20 = -4.19835e-02$
$C03 = -4.35024e-05$    $C21 = -1.36502e-04$
$C04 = -5.72196e-05$    $C22 = -1.39349e-04$    $C40 = -8.65519e-05$
$C05 = 3.14850e-07$    $C23 = -1.01009e-07$    $C41 = -6.20082e-07$
$C06 = -2.66103e-07$    $C24 = -9.31756e-07$    $C42 = -1.00842e-06$    $c60 = -4.34372e-07$ The focal lengths fB1, fB2, and fB3 of the first component B1 (surfaces R1 to R2), the second component B2 (surfaces R3 to R5), and the third component B3 (surfaces R6 to R7) and the total focal length f of this reflective optical element 11 are calculated at the azimuths of 0°, 45°, and 90°, and the results of the calculation are as follows.

TABLE 4

| focal length\azimuth | 0° | 45° | 90° |
|---|---|---|---|
| fB1 | 5.12 | 5.19 | 5.2 |
| fB2 | 102.54 | 522.41 | 148 |
| fB3 | 4.84 | 4.67 | 4.51 |
| f | −4.5 | −4.5 | −4.5 |

The focal lengths fB1, fB2, and fB3 of the respective first component B1, second component B2, and third component B3 are arranged in the order of positive, positive, and positive, but the optical system has the small optical power, because the magnitude of the focal length of the second component B2 is not less than ten times the magnitude of the focal length f so as to satisfy Eq. (3). Thus the optical system can be handled in a manner similar to a system composed of two single lenses of the first component B1 and the second component B2 in the case of a coaxial system.

Further, the magnitude of the focal length fB1 of the first component B1 is in the relation of not less than half and not more than double the magnitude of the focal length f so as to satisfy Eq. (2). If the magnitude of the focal length fB1 of the first component B1 is not more than half the magnitude of the focal length f, it will become very difficult to correct aberration. If it is not less than double the magnitude of the focal length f, the intermediate image plane will become large and this will increase the effective diameters of the reflecting surfaces after the intermediate image plane, thereby making reduction in the size of the optical element difficult.

The above table shows the focal lengths at the azimuths of 0°, 45°, and 90°, but it is noted that this relation is maintained between the azimuths 0° and 2π.

In FIG. 5, the optical element 11 is constructed of the transparent body of glass or the like with a plurality of curved, reflecting surfaces. On the surfaces of the optical element 11 there are the refracting surface (entrance surface) R1 of a refractive power, the five reflecting surfaces of the concave mirror R2, the convex mirror R3, the concave mirror R4, the convex reflecting surface R5, and the concave mirror R6, and the convex refracting surface (exit surface) R7 of a positive refractive power, formed in the order of passage of the rays from the object. The two refracting surfaces both are of the rotationally symmetric, spherical shape, and all the reflecting surfaces are of the aspherical shape symmetric with respect to only the YZ plane.

The imaging action of the optical element 11 of the present embodiment will be described next. The light from the object OB is regulated in the quantity of incident light by the stop (entrance pupil) 1 and thereafter is incident to the entrance surface R1 of the optical element 11. Then the light is reflected by the surface R2 to form an image once. Then the light is successively reflected by the surfaces R3, R4, R5, and R6 and thereafter emerges from the exit surface R7. Then the light travels through the filter 3 to be refocused to form an image on the image pickup surface 4.

The object rays form the intermediate image between the surface R2 and the surface R3 and the pupil rays the intermediate image between the surface R5 and the surface R6.

In this way the optical element 11 functions in a manner similar to a lens unit of a positive optical power as a whole with desired optical performance, through the optical powers of the entrance and exit surfaces and the optical powers of the curved reflectors in the element.

Figure 6:
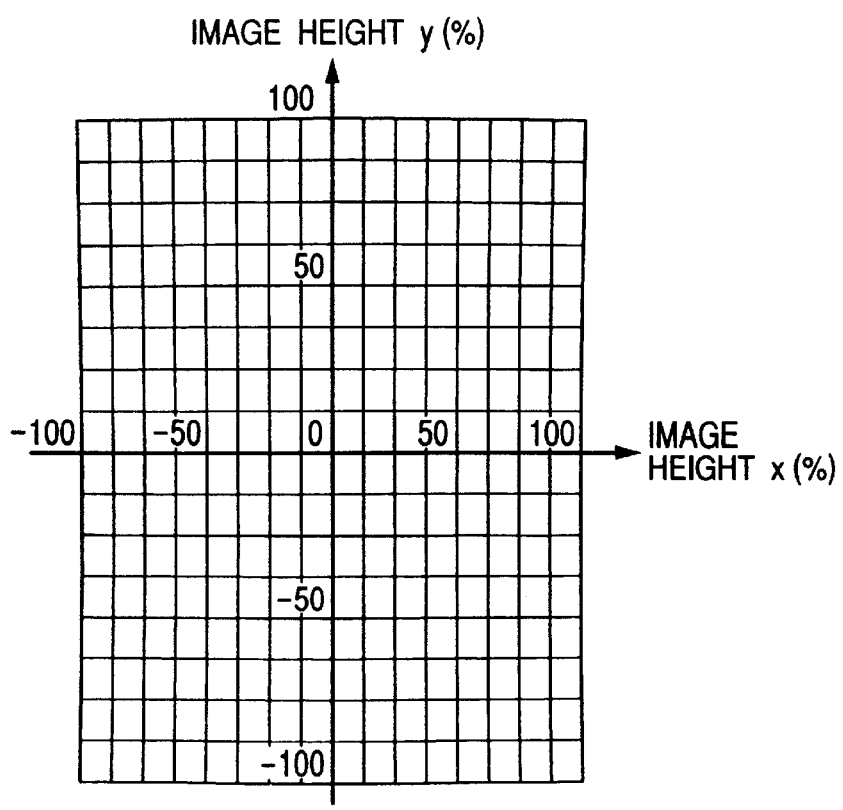
FIG. 6 distortion chart to show the distortion of the optical element in Embodiment 2.
Figure 7:
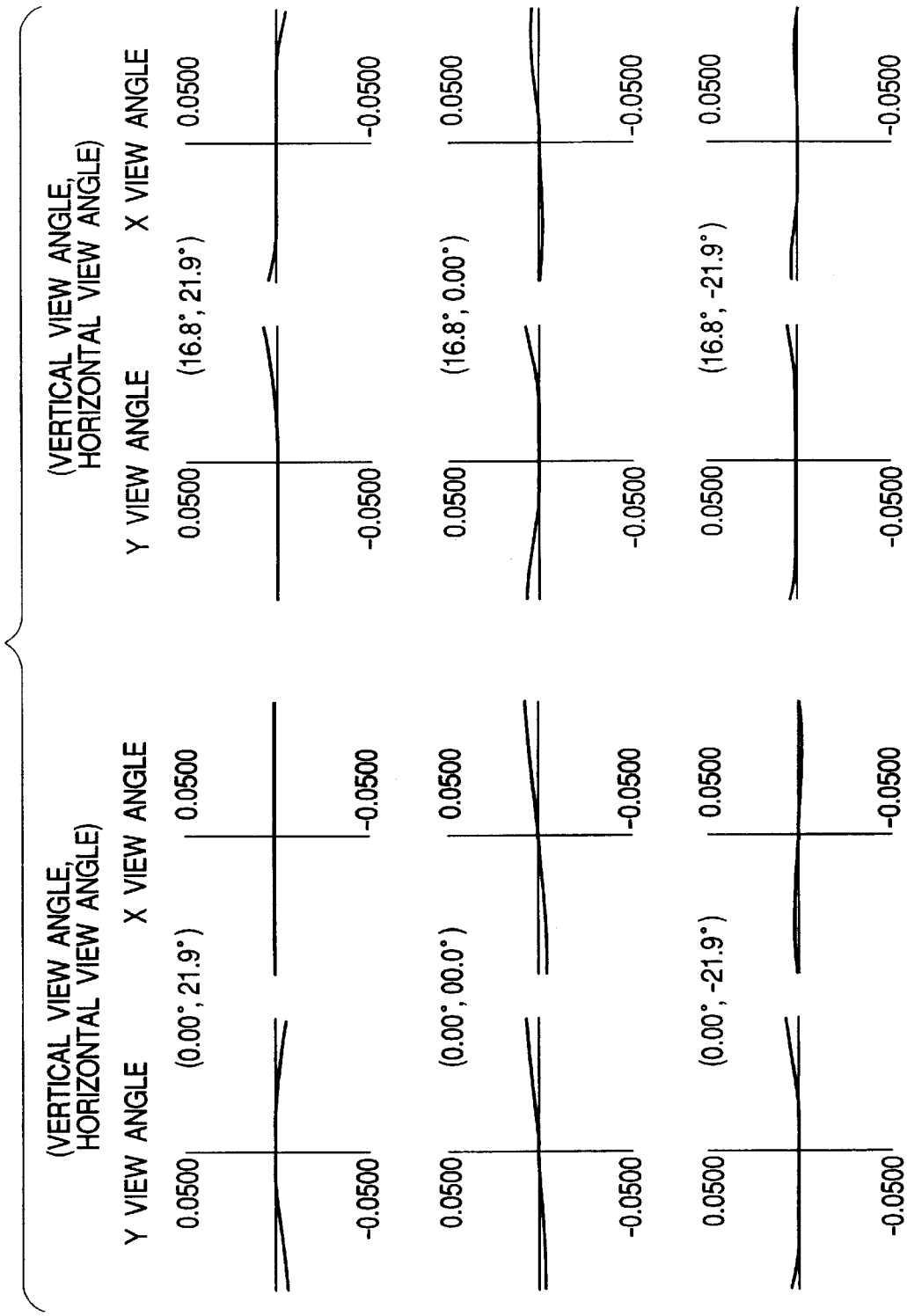
FIG. 7 is a transverse aberration chart to show the transverse aberration of the optical element in Embodiment 2.

FIG. 6 shows the state of distortion and FIG. 7 is a transverse aberration chart of the reflective optical element 11 of the present embodiment.

As seen from the figure, there is no large distortion and little asymmetric distortion. The transverse aberration is also small and the aberration is corrected in a good balance both at the center of the image plane and at the corners of the image plane.

This is because the focal lengths fB1, fB2, fB3 of the first component B1, the second component B2, and the third component B3 are arranged in the appropriate layout so as to satisfy Eq. (b 3) as described previously. If the focal lengths fB1, fB2, fB3 of the first component B1, the second component B2, and the third component B3 were set in the same sign and to values of magnitude close to each other, it would become difficult to correct aberration in terms of the balance of the optical system.

Since the magnitude of the focal length fB1 of the first component B1 is set to the appropriate value so as to satisfy Eq. (2), the optical element 11 is constructed to have both compact size and excellent optical performance.

In the present embodiment the refracting surfaces are of a rotationally symmetric shape, but the refracting surfaces may be of the rotationally asymmetric shape, depending upon the design. The refracting surfaces are desirably covered by a reflection reducing coating.

The reflecting surfaces of the reflective optical element are formed by evaporation of metal or the like. In the case of the evaporation, it is carried out according to a process of depositing a film on one of two reflector groups (R2, R4, R6 and R3, R5) and then depositing a film on the rest reflector group. The deposition on the reflecting surfaces does not have to be limited to the evaporation, but may be carried out by wet methods, for example, plating or the like. In this case, deposition can be implemented simultaneously on the two opposed reflecting surfaces. After the deposition by plating or the like, a protective film with high transmittance characteristics may be deposited thereon.

In the present embodiment the off-axial reflecting surfaces are used in the form of the back reflecting surfaces in the optical element, but they may also be used in the form of surface reflectors.

The present embodiment uses the five surfaces of the off-axial reflecting surfaces, but the reflecting surfaces do not have to be limited to five surfaces. It is, however, desirable to use at least five or more surfaces in view of correction for aberration.

The off-axial reflecting surfaces are of the shape symmetric only with respect to a certain plane (YZ plane), but they are not limited to this.

For implementing focusing, the reflective optical element is moved in parallel in the direction of the outgoing reference axis 2 or the image pickup surface is moved in parallel in the direction of the reference axis.

This reflective optical element singly functions as an image pickup optical system, but the image pickup optical system may also be constructed of a plurality of optical blocks including at least one reflective optical element of this type. Further, a zooming optical system may also be constructed so as to change the relative positions of optical blocks, as disclosed in Japanese Patent Applications Laid-Open No. 8-292372, No. 9-222561, and No. 9-258105.

Figure 8:
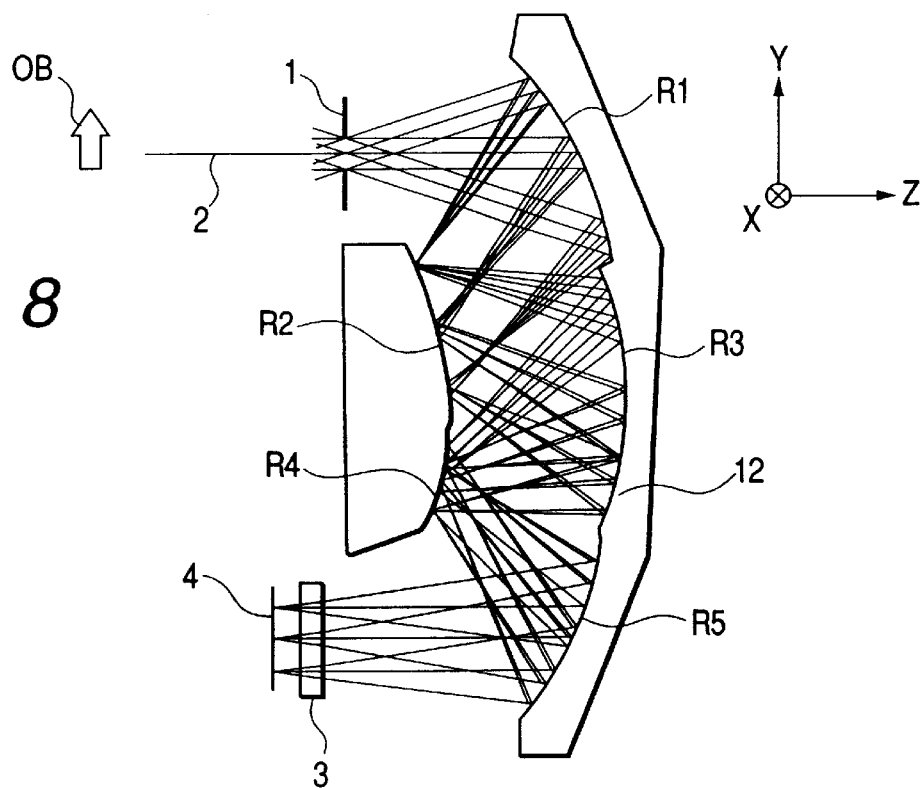
FIG. 8 is an optical cross-sectional view in the YZ plane of the imaging apparatus in Embodiment 3.

FIG. 8 is a cross-sectional view to show the main part of Embodiment 3 of the imaging apparatus using the reflective optical element of the present invention.

In FIG. 8 the same elements as those illustrated in FIG. 1 are denoted by the same reference symbols. In the optical element 12 of the present embodiment the optical action and the focal length conditions of the first, second, and third components satisfy Eqs. (2) and (3) as in the case of Embodiment 2.

FIG. 8 is the cross-sectional view in the YZ plane. The present embodiment shows the reflective optical element with the horizontal view angle of 38.13° and the vertical view angle of 29°. FIG. 8 also includes the illustration of optical paths.

The structural data of the present embodiment is as follows.

TABLE 5

| | | Horizontal half angle of view | | 19.1 | | |
| | | Vertical half angle of view | | 14.5 | | |
| | | Stop diameter | | 1.86 | | |

| i | Yi | Zi | θi | Di | Ndi | νdi | |
|---|------|-------|-------|-------|-----|-----|---|
|   | 0.00 | 0.00  | 0.00  | 12.50 | 1   |     | Stop |
| 1 | 0.00 | 12.50 | 25.95 | 12.60 | 1   |     | Reflective surface |
| 2 | −9.91 | 4.72 | 13.01 | 11.40 | 1   |     | Reflective surface |
| 3 | −14.89 | 14.98 | −3.87 | 10.80 | 1 |     | Reflective surface |

TABLE 5-continued

| | | | | | | |
|---|---|---|---|---|---|---|
| 4 | −18.25 | 4.72 | −15.87 | 11.40 | 1 | Reflective surface |
| 5 | −26.97 | 12.07 | −24.93 | 13.78 | 1 | Reflective surface |
| Filter | −26.97 | −1.71 | 0.00 | 1.10 | 1.51400 | 75.00 | Refractive surface |
| Filter | −26.97 | −2.81 | 0.00 | 0.80 | 1.51633 | 0.00 | Refractive surface |
| Filter | −26.97 | −3.61 | 0.00 | 0.70 | 1 | Refractive surface |
| Image plane | −26.97 | −4.31 | 0.00 | | 1 | Image plane |

Aspherical surface shape

R1 surface $C02 = -2.43377e-02$    $C20 = -3.04342e-02$
$C03 = -1.41833e-05$    $C21 = 3.53900e-05$
$C04 = -7.58548e-06$    $C22 = -2.49021e-05$    $C40 = -6.60722e-05$
$C05 = 6.83264e-07$     $C23 = 2.31293e-06$     $C41 = -1.16052e-06$
$C06 = 3.54072e-08$     $C24 = 2.97453e-07$     $C42 = -8.33015e-08$     $c60 = 1.07188e-06$ R2 surface $C02 = -1.61094e-02$    $C20 = -3.24343e-02$
$C03 = 4.15841e-04$     $C21 = 1.28586e-03$
$C04 = -9.36832e-05$    $C22 = -3.26715e-04$    $C40 = -1.88449e-04$
$C05 = -1.47029e-05$    $C23 = -5.92543e-05$    $C41 = -3.61942e-05$
$C06 = 4.83489e-07$     $C24 = -3.30783e-06$    $C42 = 4.81322e-05$      $c60 = 1.28229e-04$ R3 surface $C02 = -2.42806e-02$    $C20 = -3.04738e-02$
$C03 = 3.74870e-05$     $C21 = 1.21272e-04$
$C04 = -3.11398e-05$    $C22 = -6.22976e-05$    $C40 = -2.87943e-05$
$C05 = -1.33361e-07$    $C23 = -6.12938e-07$    $C41 = -9.00990e-07$
$C06 = -4.12543e-08$    $C24 = -2.68418e-07$    $C42 = -6.00586e-09$     $c60 = 5.37663e-07$ R4 surface $C02 = -3.67905e-02$    $C20 = -6.58480e-02$
$C03 = -1.12277e-03$    $C21 = -6.72984e-04$
$C04 = -4.48365e-04$    $C22 = -9.25706e-04$    $C40 = -5.79126e-04$
$C05 = -2.72177e-05$    $C23 = -1.38696e-04$    $C41 = -2.12312e-05$
$C06 = -1.81016e-06$    $C24 = -6.12108e-05$    $C42 = 9.31821e-05$      $c60 = 2.09176e-04$ R5 surface $C02 = -2.61280e-02$    $C20 = -3.25786e-02$
$C03 = -3.09157e-05$    $C21 = 4.95680e-07$
$C04 = -2.59131e-05$    $C22 = -6.52950e-05$    $C40 = -3.31477e-05$
$C05 = -1.41352e-07$    $C23 = 2.46472e-07$     $C41 = -6.67446e-07$
$C06 = -6.00774e-08$    $C24 = -3.81916e-07$    $C42 = -3.00944e-07$     $c60 = -2.18913e-07$ The focal lengths fB1, fB2, fB3 of the first component B1 (surface R1), the second component B2 (surfaces R2 to R4), and the third component B3 (surface R5) and the total focal length f of this reflective optical element 12 are calculated at the azimuths of 0°, 45°, and 90°, and the results of the calculation are as follows.

TABLE 6

| focal length\azimuth | 0° | 45° | 90° |
|---|---|---|---|
| fB1 | 9.42 | 918 | 9.13 |
| fB2 | 136.6 | 168.34 | 131 |
| fB3 | 8.68 | 8.57 | 8.64 |
| f | −5.22 | −5.22 | −5.22 |

The focal lengths fB1, fB2, fB3 of the respective first component B1, second component B2, and third component B3 are arranged in the order of positive, positive, and positive, but the optical system has the small optical power, because the magnitude of the focal length fB2 of the second component B2 is not less than ten times the magnitude of the focal length f so as to satisfy Eq. (3). Thus the optical system can be handled in a manner similar to a system composed of two single lenses of the first component B1 and the second component B2 in the case of a coaxial system.

Further, the magnitude of the focal length fB1 of the first component B1 is in the relation of not less than half and not more than double the magnitude of the focal length f so as to satisfy Eq. (2). If the magnitude of the focal length fB1 of the first component B1 is not more than half the magnitude of the focal length f, it will become very difficult to correct aberration. If it is not less than double the magnitude of the focal length f, the intermediate image plane will become large and this will increase the effective diameters of the reflecting surfaces after the intermediate image plane, thereby making reduction in the size of the optical element difficult.

The above table shows the focal lengths at the azimuths of 0°, 45°, and 90°, but it is noted that this relation is maintained between the azimuths 0° and 2π.

In FIG. 8, the optical element 12 has the surface reflectors including a plurality of curved surfaces and each of the two opposed reflector groups (the reflecting surfaces R1, R3, R5 and the reflecting surfaces R2, R4) is integrally formed. The reflecting surfaces are all of the aspherical shape symmetric with respect to only the YZ plane.

The imaging action of the optical element 12 of the present embodiment will be described next. The light from the object OB is regulated in the quantity of incident light by the stop (entrance pupil) 1 and thereafter is reflected by the surface R1 of the optical element 12 to form an image once. Then the light is successively reflected by the surfaces R2, R3, R4, R5 and then passes through the filter 3 to be refocused to form an image on the image pickup surface 4.

The object rays form an intermediate image between the surface R1 and the surface R2 and the pupil rays an intermediate image between the surface R4 and the surface R5.

In this way the optical element 12 functions in a manner similar to a lens unit of a positive optical power as a whole with desired optical performance, through the optical powers of the plurality of curved reflectors.

Figure 9:
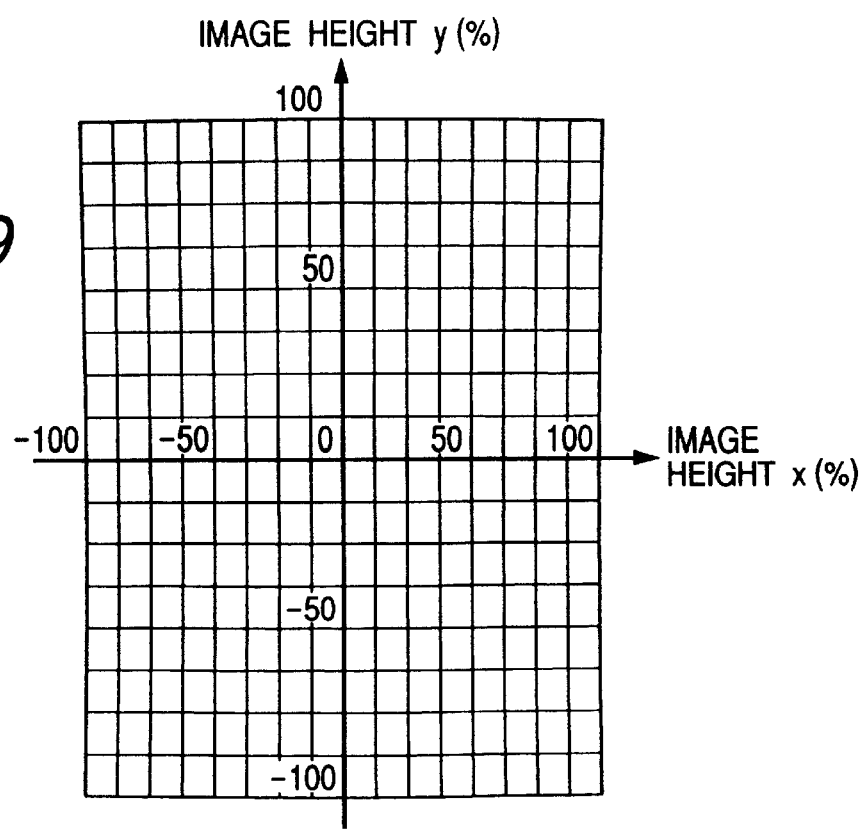
FIG. 9 distortion chart to show the distortion of the optical element in Embodiment 3.
Figure 10:
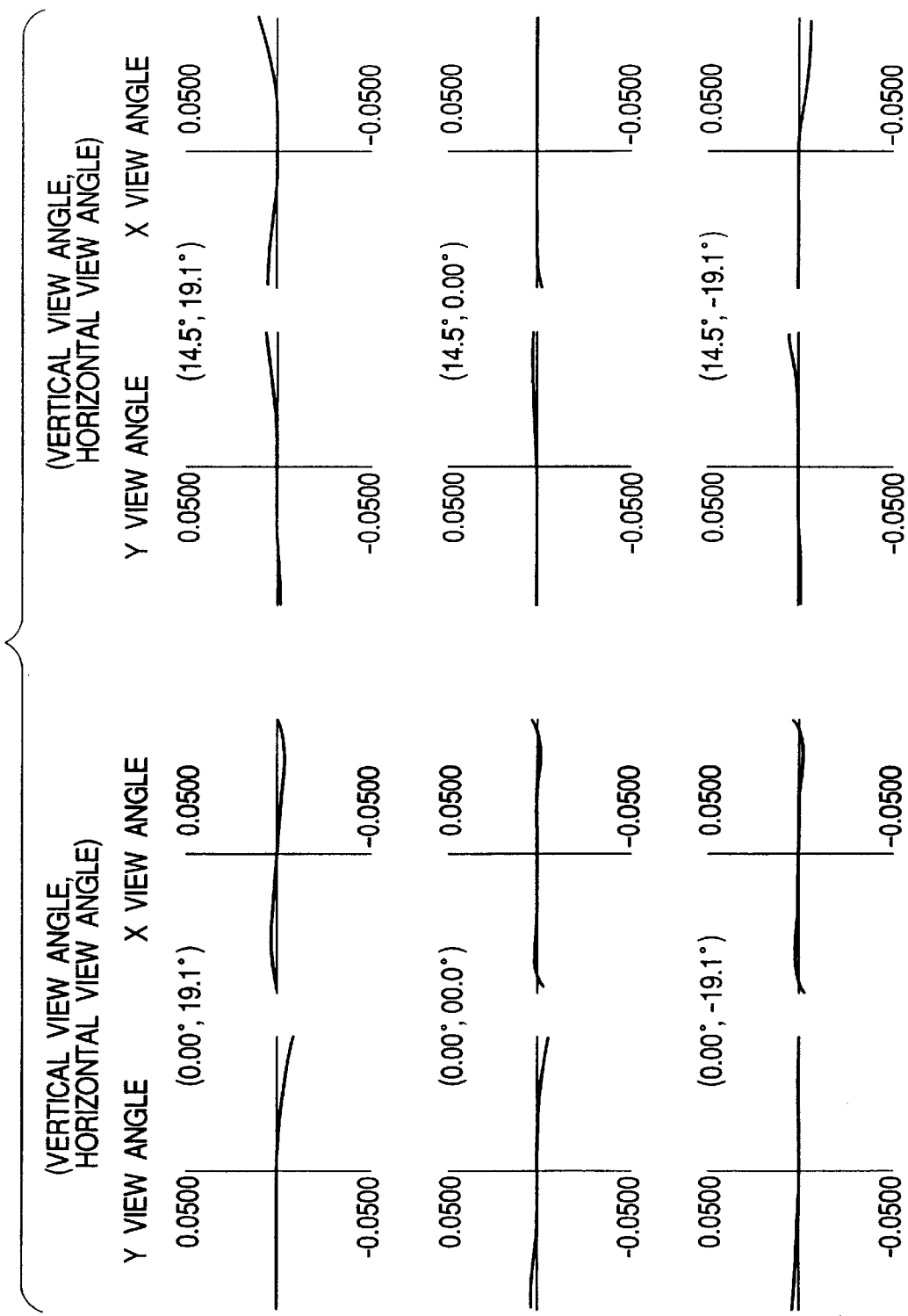
FIG. 10 is a transverse aberration chart to show the transverse aberration of the optical element in Embodiment 3.

FIG. 9 shows the state of distortion and FIG. 10 shows a transverse aberration chart of the reflective optical element of the present embodiment.

As seen from the figure, there is no large distortion and little asymmetric distortion. The transverse aberration is also small and the aberration is corrected in a good balance both at the center of the image plane and at the corners of the image plane.

This is because the focal lengths fB1, fB2, fB3 of the first component B1, the second component B2, and the third component B3 are arranged in the appropriate layout so as to satisfy Eq. (3) as described previously. If the focal lengths fB1, fB2, fB3 of the first component B1, the second component B2, and the third component B3 were set in the same sign and to values of magnitude close to each other, it would become difficult to correct aberration in terms of the balance of the optical system.

Since the magnitude of the focal length fB1 of the first component B1 is set to the appropriate value so as to satisfy Eq. (2), the optical element 12 is constructed to have both a compact size and excellent optical performance.

The reflecting surfaces of the reflective optical element are formed by evaporation of metal or the like. The deposition on the reflecting surfaces does not have to be limited to the evaporation, but may be carried out by wet methods, for example, plating or the like. After the deposition by plating or the like, a protective film with high transmittance characteristics may be deposited thereon.

The present embodiment uses the five surfaces of the off-axial reflecting surfaces, but the reflecting surfaces do not have to be limited to five surfaces. It is, however, desirable to use at least five or more surfaces in view of correction for aberration.

The off-axial reflecting surfaces are of the shape symmetric only with respect to a certain plane (YZ plane), but they are not limited to this.

This reflective optical element singly functions as an image pickup element, but an image pickup optical system may also be constructed of a plurality of optical elements including at least one reflective optical element of this type.

Further, a zooming optical system may also be constructed so as to change the relative positions of optical elements, as suggested in Japanese Patent Applications Laid-Open No. 8-292372, No. 9-222561, and No. 9-258105.

Figure 11:
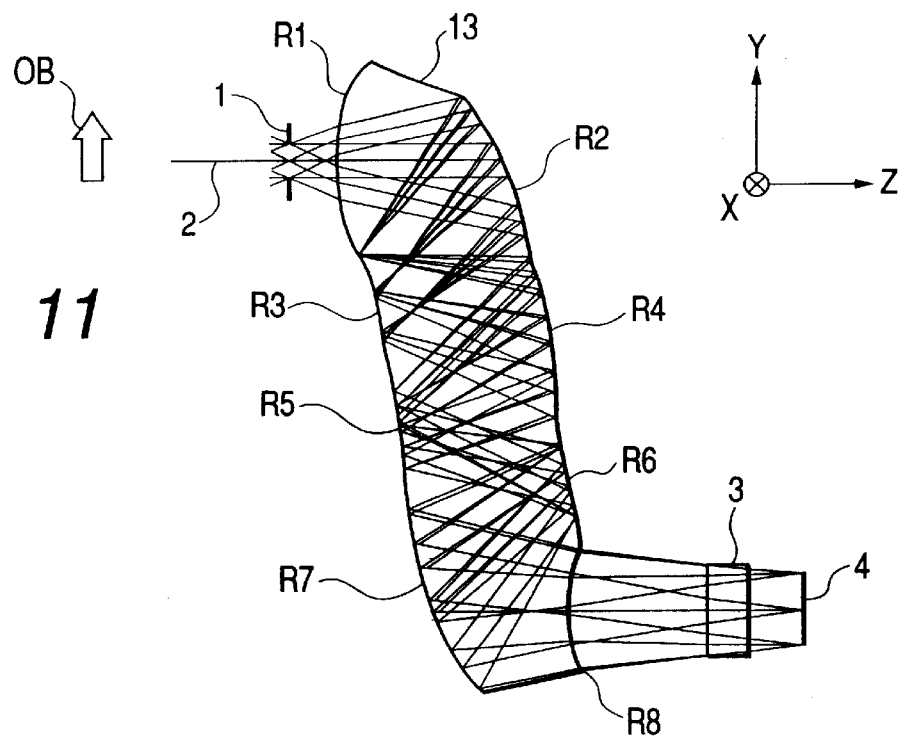
FIG. 11 is an optical cross-sectional view in the YZ plane of the imaging apparatus in Embodiment 4.

FIG. 11 is a cross-sectional view to show the main part of Embodiment 4 of the imaging apparatus using the reflective optical element of the present invention.

In FIG. 11 the same elements as those illustrated in FIG. 1 are denoted by the same reference symbols. In the present embodiment the optical action and the focal length conditions of the first, second, and third components are the same as Eqs. (1) and (2) described in Embodiment 1.

FIG. 11 is the cross-sectional view in the YZ plane of the optical element 13. The present embodiment shows the reflective optical element with the horizontal view angle of 43.8° and the vertical view angle of 33.55°. FIG. 11 also includes the illustration of optical paths.

The structural data of the present embodiment is as follows.

TABLE 7

| | | | | | | |
|---|---|---|---|---|---|---|
| Horizontal half angle of view | | | 21.9 | | | |
| Vertical half angle of view | | | 16.8 | | | |
| Stop diameter | | | 1.60 | | | |

| i | Yi | Zi | θi | Di | Ndi | νdi | |
|---|---|---|---|---|---|---|---|
| | 0.00 | 0.00 | 0.00 | 2.50 | 1 | | Stop |
| 1 | 0.00 | 2.50 | 0.00 | 7.80 | 1.53041 | 55.50 | Refractive surface |
| 2 | 0.00 | 10.30 | 24.00 | 9.00 | 1.53041 | 55.50 | Reflective surface |
| 3 | −6.69 | 4.28 | 16.00 | 8.90 | 1.53041 | 55.50 | Reflective surface |
| 4 | −9.14 | 12.83 | 7.00 | 8.50 | 1.53041 | 55.50 | Reflective surface |
| 5 | −13.39 | 5.47 | 6.00 | 8.50 | 1.53041 | 55.50 | Reflective surface |
| 6 | −16.02 | 13.55 | 13.00 | 9.00 | 1.53041 | 55.50 | Reflective surface |
| 7 | −22.27 | 7.08 | 22.00 | 6.50 | 1.53041 | 55.50 | Reflective surface |
| 8 | −22.27 | 13.58 | 0.00 | 6.81 | 1 | | Refractive surface |
| Filter | −22.27 | 20.39 | 0.00 | 1.89 | 1.54427 | 70.60 | Refractive surface |
| Filter | −22.27 | 22.28 | 0.00 | 1.10 | 1.51400 | 75.00 | Refractive surface |
| Filter | −22.27 | 23.38 | 0.00 | 0.80 | 1.51633 | 0.00 | Refractive surface |
| Filter | −22.27 | 24.18 | 0.00 | 0.90 | 1 | | Refractive surface |
| Image plane | −22.27 | 25.08 | 0.00 | | 1 | | Image plane |

Aspherical surface shape

R1 surface $C02 = 2.37449e{-}02$  $C20 = -2.84895e{-}02$
$C04 = 1.26292e{-}04$  $C22 = -6.43289e{-}03$  $C40 = -2.97769e{-}04$
$C06 = 6.51599e{-}05$  $C24 = 6.20762e{-}04$  $C42 = 7.06751e{-}04$  $c60 = -1.61977e{-}04$ R2 surface $C02 = -2.77090e{-}02$  $C20 = -4.05133e{-}02$
$C03 = 1.78011e{-}04$  $C21 = -3.88537e{-}04$
$C04 = -1.22407e{-}06$  $C22 = -7.80418e{-}05$  $C40 = -6.52602e{-}06$
$C05 = 7.82028e{-}06$  $C23 = -4.64287e{-}06$  $C41 = 1.78229e{-}06$
$C06 = 1.69100e{-}06$  $C24 = 2.50989e{-}06$  $C42 = 4.63060e{-}07$  $c60 = 7.89361e{-}07$ TABLE 7-continued R3 surface C02 = −2.75909e−02    C20 = −6.77789e−02
C03 = 1.10682e−03     C21 = −6.45515e−03
C04 = 1.04430e−03     C22 = −1.03825e−03    C40 = −1.63785e−03
C05 = −8.62662e−05    C23 = −5.30274e−04    C41 = −1.20751e−04
C06 = −4.95359e−05    C24 = −6.67405e−05    C42 = −1.21283e−04    c60 = 6.02201e−04

R4 surface

C02 = −2.49976e−02    C20 = −3.72289e−02
C03 = −1.25382e−05    C21 = −1.04626e−03
C04 = −9.12934e−06    C22 = −1.01933e−04    C40 = −4.91831e−05
C05 = −4.69154e−06    C23 = −8.87025e−07    C41 = −4.62077e−06
C06 = −5.54290e−07    C24 = −1.16917e−06    C42 = −1.46230e−06    c60 = −3.93653e−07

R5 surface

C02 = −1.37165e−02    C20 = −2.17519e−02
C03 = −5.19485e−04    C21 = −5.75337e−03
C04 = −8.33995e−06    C22 = −5.91204e−04    C40 = 5.97628e−05
C05 = −3.36154e−05    C23 = −2.29254e−05    C41 = 7.13352e−06
C06 = −7.52856e−06    C24 = −4.62838e−05    C42 = −3.79059e−05    c60 = −6.57240e−06

R6 surface

C02 = 1.56082e−02     C20 = 3.45280e−02
C03 = 2.64677e−04     C21 = −1.67735e−03
C04 = 9.55706e−05     C22 = 3.32216e−04     C40 = 6.15339e−05
C05 = −5.66446e−06    C23 = 2.19835e−05     C41 = −5.48106e−06
C06 = −3.42558e−06    C24 = 1.04297e−05     C42 = 1.73024e−05     c60 = 2.69594e−05

R7 surface

C02 = 2.72651e−02     C20 = 3.34334e−02
C03 = −3.78753e−05    C21 = −5.32572e−05
C04 = 3.28542e−05     C22 = 9.79504e−05     C40 = 2.95064e−05
C05 = −4.67151e−07    C23 = −1.14394e−06    C41 = 1.72852e−06
C06 = −3.91510e−08    C24 = 8.43746e−08     C42 = −8.08044e−08    c60 = 8.17671e−08

R8 surface

C02 = 6.28023e−02     C20 = 5.70363e−02
C04 = 3.90020e−04     C22 = 1.04312e−03     C40 = −3.46795e−04
C06 = −7.29227e−06    C24 = −1.21909e−05    C42 = −2.31395e−05    c60 = −9.05139e−06

The focal lengths fB1, fB2, fB3 of the first component B1 (surfaces R1 to R2), the second component B2 (surfaces R3 to R6), and the third component B3 (surfaces R7 to R8) and the total focal length f of this reflective optical element 13 are calculated at the azimuths of 0°, 45°, and 90°, and the results of the calculation are as follows.

TABLE 8

| focal length\azimuth | 0° | 45° | 90° |
| --- | --- | --- | --- |
| fB1 | 5.35 | 4.85 | 4.32 |
| fB2 | −13.78 | −10.69 | −24.45 |
| fB3 | 6.09 | 5.84 | 5.62 |
| f | −4.5 | −4.49 | −4.5 |

The focal lengths fB1, fB2, fB3 of the respective first component B1, second component B2, and third component B3 are arranged in the order of positive, negative, and positive so as to satisfy Eq. (1). The magnitude of the focal length fB1 of the first component B1 is in the relation of not less than half and not more than double the magnitude of the total focal length f of the optical element 13 so as to satisfy Eq. (2). If the magnitude of the focal length fB1 of the first component B1 is not more than half the magnitude of the focal length f of the optical element 13, it will be very difficult to effect correction for aberration. If it is not less than double the magnitude of the focal length f of the optical element 13 on the other hand, the intermediate image plane will become large and this will increase the effective diameters of the reflecting surfaces after the intermediate image plane, thus making reduction in the size of the optical element difficult.

The above table presented the list of the focal lengths at the azimuths of 0°, 45°, and 90°, but it is noted that this relation is maintained between the azimuths 0° and 2π.

In FIG. 11, the optical element 13 is constructed of the transparent body of glass or the like having the plurality of curved, reflecting surfaces. On the surfaces of the optical element 13 there are the convex refracting surface (entrance surface) R1 of an optical power, the six reflecting surfaces of the concave mirror R2, the convex mirror R3, the concave mirror R4, the convex reflecting surface R5, the convex reflector R6, and the concave reflector R7, and the convex refracting surface (exit surface) R8, formed in the order of passage of the rays from the object. The two refracting surfaces are both of the rotationally asymmetric, aspherical shape, and all the reflecting surfaces are of the shape symmetric with respect to only the YZ plane.

The imaging action of the optical element 13 of the present embodiment will be described next. The light from the object OB is regulated in the quantity of incident light by the stop (entrance pupil) 1 and thereafter is incident to the entrance surface R1 of the optical element 13. Then the light is reflected by the surface R2 to form an image once and thereafter the light is successively reflected by the surfaces R3, R4, R5, R6, R7. Then the light emerges from the exit surface R8 and passes through the filter 3 to be refocused to form an image on the image pickup surface 4.

The object rays form an intermediate image between the surface R2 and the surface R3 and the pupil rays form an intermediate image between the surface R5 and the surface R6.

In this way the optical element 13 functions in manner similar to a lens unit of a positive optical power power as a whole with desired optical performance, through the optical powers of the entrance and exit surfaces and the optical powers of the curved reflectors in the element.

Figure 12:
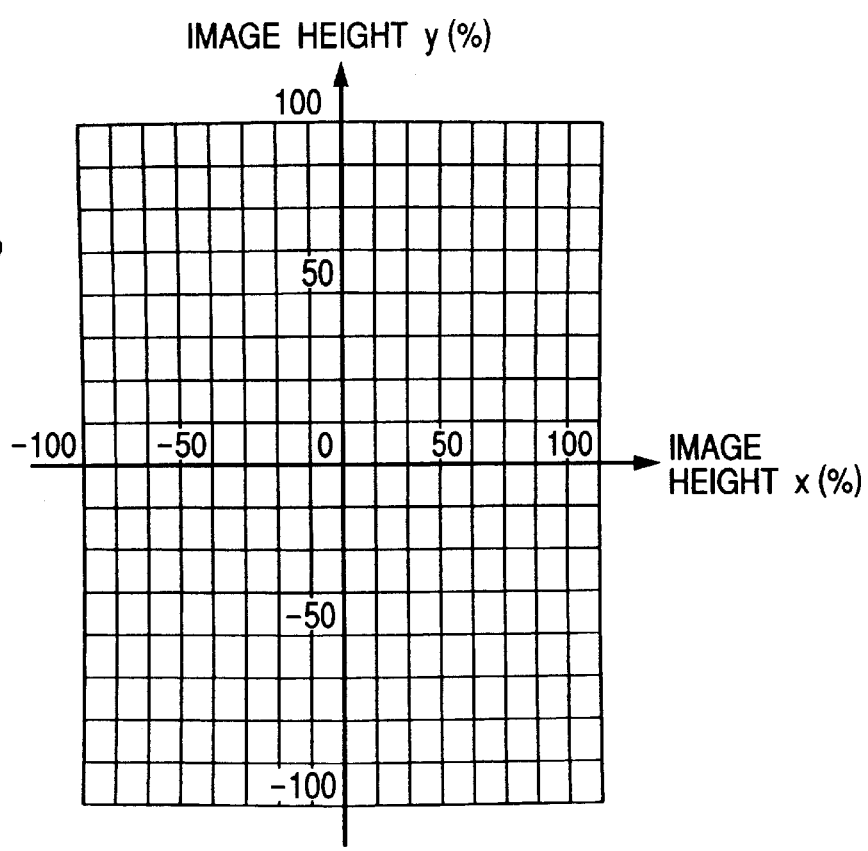
FIG. 12 is a distortion chart to show the distortion of the optical element in Embodiment 4.
Figure 13:
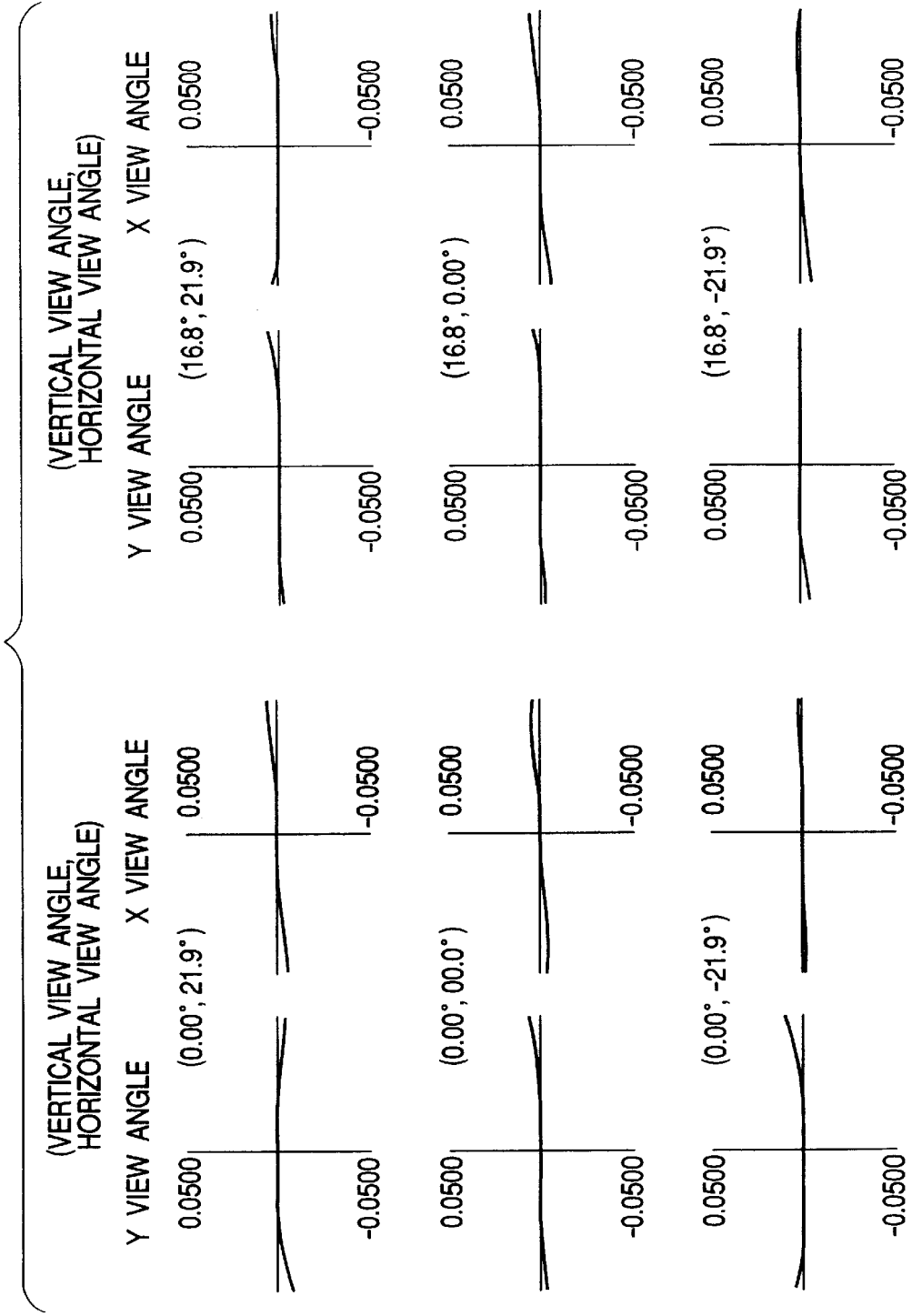
FIG. 13 is a transverse aberration chart to show the transverse aberration of the optical element in Embodiment 4.

FIG. 12 shows the state of distortion and FIG. 13 the transverse aberration chart of the reflective optical element of the present embodiment.

As seen from the figure, there is no large distortion and little asymmetric distortion. The transverse aberration is also small and the aberration is corrected in a good balance both at the center of the image plane and at the corners of the image plane.

This is because the focal lengths fB1, fB2, fB3 of the first component B1, the second component B2, and the third component B3 are arranged in the appropriate layout so as to satisfy Eq.(1) as described previously. If the focal lengths fB1, fB2, fB3 of the first component B1, the second component B2, and the third component B3 were set in the same sign and to values of magnitude close to each other, it would become difficult to correct aberration in terms of the balance of the optical system.

Since the magnitude of the focal length fB1 of the first component B1 is set to the appropriate value so as to satisfy Eq. (2), the optical element is constructed to have both the compact size and excellent optical performance.

Although the present embodiment employs a rotationally asymmetric, aspherical shape for the refracting surfaces, the refracting surfaces may also be of a rotationally symmetric shape, depending upon the design. The refracting surfaces are desirably covered by a reflection reducing coating.

The reflecting surfaces of the reflective optical element are formed by evaporation of metal or the like. In the case of the evaporation, it is carried out according to a process of depositing a film on one of two reflector groups (R2, R4, R6 and R3, R5, R7) and then depositing a film on the rest reflector group. The deposition on the reflecting surfaces does not have to be limited to the evaporation, but may be carried out by wet methods, for example, plating or the like. In this case, deposition can be implemented simultaneously on the two opposed reflecting surfaces. After the deposition by plating or the like, a protective film with high transmittance characteristics may be deposited thereon.

In the present embodiment the off-axial reflecting surfaces are used in the form of the back reflecting surfaces in the optical element, but they may also be used in the form of surface reflectors.

The present embodiment uses the six surfaces of the off-axial reflecting surfaces, but the reflecting surfaces do not have to be limited to six surfaces. It is, however, desirable to use at least five or more surfaces in view of correction for aberration.

The off-axial reflecting surfaces are of the shape symmetric only with respect to a certain plane (YZ plane), but they are not limited to this.

This reflective optical element singly functions as an image pickup element, but an image pickup optical system may also be constructed of a plurality of optical elements including at least one reflective optical element of this type. Further, a zooming optical system may also be constructed so as to change the relative positions of optical elements, as suggested in Japanese Patent Applications Laid-Open No. 8-292372, No. 9-222561, and No. 9-258105.

As described above, when the object image is formed on the predetermined plane by use of the optical element wherein the plurality of reflecting surfaces consisting of the curved surfaces and/or planes are formed on the surfaces of the transparent body, the excellent optical performance is achieved by the appropriate power layout of the surfaces and it becomes feasible to accomplish the reflective optical element with the reduced effective diameter of the optical element and with the wide angle of view, and the imaging apparatus using it, by setting the focal length of from the entrance surface to the intermediate image to the appropriate value.

In addition, it becomes feasible to create an optical element with a reduced effective diameter of the optical system, which is the optical system with a wide angle of view, and an imaging apparatus using it, by dividing the optical element having the plurality of off-axial reflecting surfaces into the three partial systems, the part for intermediately focusing the entering light, the-part for focusing the light from the intermediate image plane on the pupil plane, and the part for secondarily focusing the light from the pupil on the image pickup surface by defining the focal lengths of the respective parts in the appropriate relation.

Further, both the size reduction of the optical element and the excellent optical performance can be accomplished, because the magnitude of the focal length of the intermediate focusing part is set to the appropriate value.

The present invention presents the effects including the above.

What is claimed is:

1. An optical element comprising:

a plurality of reflective curved surfaces for successively reflecting light incident to said optical element, said plurality of reflective curved surfaces comprising a reflective curved surface for first reflecting the light incident to said optical element, as a surface A, a reflective curved surface for next reflecting the light reflected by the surface A, as a surface B, a reflective curved surface for finally reflecting the light incident to said optical element, as a surface D, and a reflective curved surface immediately before the surface D, as a surface C, wherein, in the order of the path of the light incident on said optical element, a first optical component is defined before the surface A, a second optical component from the surface B to the surface C, and a third optical component after the surface D and wherein, where $fB1(\theta)$, $fB2(\theta)$, and $fB3(\theta)$ are focal lengths of said first optical component, said second optical component, and said third optical component, respectively, at an azimuth $\theta$, the focal lengths satisfy the following conditions in the azimuth range of $0 \leq \theta < 2\pi$:

$fB1(\theta) > 0$,
$fB2(\theta) < 0$,
$fB3(\theta) > 0$, wherein, $f(\theta)$ is the total focal length of said optical element at the azimuth $\theta$, and the focal length satisfies the following condition in the azimuth range of $0 < \theta < 2\pi$:

$|f(\theta)|/2 < fB1(\theta) < 2|f(\theta)|$.

2. The optical element according to claim 1, said optical element being a transparent body having two refracting surfaces and a plurality of reflective curved surfaces as internal reflectors.

3. The optical element according to claim 1, said optical element having a plurality of reflective curved surfaces as surface reflectors.

4. The optical element according to claim 1, wherein at least one of said reflective curved surfaces is of an aspherical shape symmetric only with respect to one symmetry plane.

5. An optical device comprising:

the optical element of claim 1.

* * * * *

UNITED STATES PATENT AND TRADEMARK OFFICE
CERTIFICATE OF CORRECTION

PATENT NO. : 6,409,352 B1
DATED : June 25, 2002
INVENTOR(S) : Toshihiro Sunaga

It is certified that error appears in the above-identified patent and that said Letters Patent is hereby corrected as shown below:

Column 4,
Line 32, "FIG. 6" should read -- FIG. 6 is a --.
Line 39, "FIG. 9" should read -- FIG. 9 is a --.

Column 6,
Line 2, "R2 Y-axis:" should read -- R2
                                      Y-axis: --.

Column 24,
Line 12, "the-part" should read -- the part --.

Signed and Sealed this

Third Day of December, 2002

JAMES E. ROGAN
*Director of the United States Patent and Trademark Office*